（12） United States Patent
Guan et al.

(10) Patent No.: US 12,137,365 B2
(45) Date of Patent: Nov. 5, 2024

(54) INFORMATION REPORTING METHOD AND APPARATUS

(71) Applicant: HUAWEI TECHNOLOGIES CO., LTD., Shenzhen (CN)

(72) Inventors: Peng Guan, Shenzhen (CN); Xi Zhang, Chengdu (CN); Bo Fan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 17/746,398

(22) Filed: May 17, 2022

(65) Prior Publication Data

US 2022/0279370 A1 Sep. 1, 2022

Related U.S. Application Data

(63) Continuation of application No. PCT/CN2020/075088, filed on Feb. 13, 2020.

(30) Foreign Application Priority Data

Nov. 18, 2019 (WO) ................ PCT/CN2019/119288

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04B 17/336* (2015.01); *H04L 5/0051* (2013.01)

(58) Field of Classification Search
CPC .................................................. H04W 24/10
(Continued)

(56) References Cited

U.S. PATENT DOCUMENTS

2019/0222283 A1 7/2019 Yum et al.
2019/0245603 A1 8/2019 Yum et al.

FOREIGN PATENT DOCUMENTS

CN 107370559 A 11/2017
CN 108282212 A 7/2018
(Continued)

OTHER PUBLICATIONS

ZTE, "Enhancements on multi-beam operation", R1-1911931, Nov. 9, 2019, total 18 pages.
(Continued)

*Primary Examiner* — Angel T Brockman
(74) *Attorney, Agent, or Firm* — HAUPTMAN HAM, LLP

(57) ABSTRACT

This application provides an information reporting method, including: receiving configuration information sent by a network device, where the configuration information is used to configure a first resource set and a second resource set, the first resource set is used for channel measurement, the second resource set is used for interference measurement, identifiers that are of N first resources and that are in the first resource set are in a one-to-one correspondence with identifiers that are of N second resources and that are in the second resource set, and N is an integer greater than 1, where if the identifiers of the N second resources are the same, receive parameters of the N first resources are the same; measuring signal strengths on the N first resources, to obtain N first signal strengths. According to this application, overheads of interference measurement resources are reduced.

14 Claims, 16 Drawing Sheets

(51) Int. Cl.
*H04B 17/336* (2015.01)
*H04L 5/00* (2006.01)

(58) Field of Classification Search
USPC .......................................................... 370/329
See application file for complete search history.

(56) References Cited

FOREIGN PATENT DOCUMENTS

| CN | 108282321 A | 7/2018 |
|----|-------------|--------|
| CN | 109565400 A | 4/2019 |
| CN | 109802806 A | 5/2019 |
| CN | 110062416 A | 7/2019 |

OTHER PUBLICATIONS

Sony, "Enhancements on multi-beam operation", R1-1912356, Nov. 9, 2019, total 3 pages.
CMCC, "Enhancements on multi-beam operation", 3GPP TSG RAN WG1 #98bis R1-1910171, Oct. 20, 2019, total 8 pages.
3GPP TS 38.211 V15.7.0: "3rd Generation Partnership Project; Technical Specification Group Radio Access Network; NR; Physical channels and modulation (Release 15)", Sep. 2019, total 97 pages.
3GPP TS 38.212 V15.7.0 (Sep. 2019), 3rd Generation Partnership Project; Technical Specification Group Radio Access Network; NR; Multiplexing and channel coding(Release 15), 101 pages.
3GPP TS 38.213 V15.7.0 (Sep. 2019), 3rd Generation Partnership Project; Technical Specification Group Radio Access Network; NR; Physical layer procedures for control(Release 15), 108 pages.
3GPP TS 38.214 V15.7.0 (Sep. 2019), 3rd Generation Partnership Project; Technical Specification Group Radio Access Network; NR; Physical layer procedures for data(Release 15), 106 pages.
3GPP TS 38.321 V15.7.0: "3rd Generation Partnership Project; Technical Specification Group Radio Access Network; NR; Medium Access Control (MAC) protocol specification (Release 15)", Sep. 2019, total 78 pages.
3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.
3GPP TS 38.133 V15.7.0: "3rd Generation Partnership Project; Technical Specification Group Radio Access Network; NR; Requirements for support of radio resource management(Release 15)", Sep. 2019, total 1043 pages.
3GPP TS 38.306 V15.7.0 (Sep. 2019), 3rd Generation Partnership Project; Technical Specification Group Radio Access Network; NR; User Equipment (UE) radio access capabilities(Release 15), 55 pages.
Nokia et al: "Enhancements on Multi-beam Operation", 3GPP Draft; R1-1910916, Oct. 4, 2019, total 16 pages.
Extended European Search Report issued in corresponding European Application No. 20891403.6, dated Oct. 20, 2022, pp. 1-9.

```
ReportConfig#1: {
...
Reporting quantity: CRI-SINR;
Channel measurement resource setting: ResourceConfig#1: {
resourcesetlist: {
    resourceset#1: {
       CSI-RS resource#1
       CSI-RS resource#2
            }
      }
   }
Interference measurement resource setting: ResourceConfig#2: {
resourcesetlist: {
    resourceset#2: {
       CSI-RS resource#11
       CSI-RS resource#12
         }
      }
                          }
```

FIG. 1

```
ReportConfig#1: {
...
Reporting quantity: CRI-SINR;
Channel measurement resource setting: ResourceConfig#1: {
resourcesetlist: {
    resourceset#1: {
      CSI-RS resource#1
      CSI-RS resource#1
       repetition: ON
    }
  }
}
Interference measurement resource setting: ResourceConfig#2: {
resourcesetlist: {
    resourceset#2: {
      CSI-RS resource#11
      CSI-RS resource#12
      }
   }
               }
```

FIG. 5

```
ReportConfig#1: {
...
Reporting quantity: CRI-SINR;
Channel measurement resource setting: ResourceConfig#1: {
resourcesetlist: {
      resourceset#1: {
        CSI-RS resource#1
        CSI-RS resource#2
         repetition: OFF
      }
    }
  }
Interference measurement resource setting: ResourceConfig#2: {
resourcesetlist: {
      resourceset#2: {
        CSI-RS resource#11
        CSI-RS resource#11
         }
     }
                      }
```

FIG. 8

```
ReportConfig#1: {
...
Reporting quantity: CRI-RSRP;
Channel measurement resource setting: ResourceConfig#1: {
resourcesetlist: {
    resourceset#1: {
       CSI-RS resource#1
       CSI-RS resource#1
        repetition: ON
     }
   }
 }
```

INFORMATION REPORTING METHOD AND APPARATUS

CROSS-REFERENCE TO RELATED APPLICATIONS

This application is a continuation of International Application No. PCT/CN2020/075088, filed on Feb. 13, 2020, which claims priority to PCT International Application No. PCT/CN2019/119288, filed on Nov. 18, 2019. The disclosures of the aforementioned applications are hereby incorporated in entirety by reference.

BACKGROUND

In a high-frequency communication system, to overcome a path loss, a network and a terminal device usually use a directional high-gain antenna array to form an analog beam to communicate with each other. Generally, the analog beam is directional, and a main lobe direction and a 3 dB beam width is used to describe an analog beam pattern. A narrower beam width indicates a larger antenna gain. Based on the analog beam, the network device and the terminal device sends a signal and receive a signal in a direction. Downlink communication is used as an example. The network device sends a signal in a direction, and the terminal device receives the signal in the direction. When the direction in which the signal is sent is aligned with the direction in which the signal is received, the network device and the terminal device normally communicates with each other. To implement beam alignment (that is, beam direction alignment of a transmit end and a receive end), beams need to be trained.

In an existing protocol, downlink beam training is implemented in this way: The network device sends one or more reference signals. The terminal device measures the reference signals sent by the network device, and reports a measurement result. Through the downlink beam training, functions such as beam selection, beam quality measurement and reporting, and beam tracking is implemented. A result of the downlink beam training is used by the network device to indicate a beam.

In 3GPP Release 16, to implement beam training based on an L1 (layer 1, that is, a physical layer)-SINR (SINR for short below), the network device is supported to configure one or more reference signal resource sets used for channel measurement (channel measurement resource sets, CMR sets) and one or more reference signal resource sets used for interference measurement (interference measurement resource sets, IMR sets). In addition, reference signal resources (CMRs) in the CMR set are in a one-to-one correspondence with reference signal resources (IMRs) in the IMR set. For example, CMR 1 corresponds to IMR 1, and CMR 2 corresponds to IMR 2. Consequently, resource overheads are increased in such a resource correspondence manner.

SUMMARY

This application provides an information reporting method and an apparatus, to help reduce resource overheads.

According to a first aspect, this application provides an information reporting method. The method includes: receiving configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the identifiers of the N second resources are the same, receive parameters of the N first resources are the same; measuring signal strengths on the N first resources, to obtain N first signal strengths; measuring a signal strength on the second resource, to obtain a second signal strength; and reporting one or more first signal to interference plus noise ratios (SINRs) to the network device, where the first SINR is an SINR obtained based on the N first signal strengths and the second signal strength.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

In the method described in the first aspect, that the identifiers that are of the N second resources and that are included in the second resource set are the same is understood as: The second resource set includes one second resource. Therefore, based on the method described in the first aspect, overheads of interference measurement resources are reduced.

In a possible implementation, if the identifiers of the N second resources are the same, the configuration information is further used to indicate that the receive parameters of the N first resources are the same. Based on this possible implementation, the network device indicates to the terminal device that the receive parameters of the N first resources are the same. Alternatively, the terminal device determines, based on whether the identifiers of the N second resources are the same, whether the receive parameters of the N first resources are the same.

In a possible implementation, a implementation of measuring a signal strength on the second resource, to obtain a second signal strength is: measuring the signal strength on the second resource once, to obtain one second signal strength, where a receive parameter of the second resource is the same as the receive parameters of the N first resources. Alternatively, that a receive parameter of the second resource is the same as the receive parameters of the N first resources are expressed as: The receive parameter of the second resource is QCLed with the receive parameters of the N first resources.

Based on this possible implementation, the terminal measures a plurality of first resources and one second resource by using a same receive parameter, so that measurement load of the terminal device is reduced, and communication overheads of the network device is reduced.

In a possible implementation, the configuration information is further used to configure receive parameters of one or more of the N first resources. Based on this possible implementation, the terminal device performs signal measurement on the N first resources and the second resource by using a same receive parameter (that is, the receive parameters of the one or more of the N first resources).

In a possible implementation, the configuration information is further used to configure the receive parameters of the N first resources. Based on this possible implementation, the terminal device performs signal measurement on the N first resources and the second resource by using a same receive parameter (that is, the configured receive parameters of the N first resources).

In a possible implementation, the configuration information is further used to configure the receive parameter of the second resource. Based on this possible implementation, the terminal device performs signal measurement on the N first resources and the second resource by using a same receive parameter (that is, the configured receive parameter of the second resource).

According to a second aspect, this application provides an information reporting method. The method includes: sending configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the identifiers of the N second resources are the same, the configuration information is further used to indicate that receive parameters of the N first resources are the same; sending a first reference signal on each of the N first resources; sending a second reference signal on the second resource; and receiving one or more first signal to interference plus noise ratios (SINRs) reported by the terminal device.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

In a possible implementation, the configuration information is further used to configure receive parameters of one or more of the N first resources, the configuration information is further used to configure the receive parameters of the N first resources, or the configuration information is further used to configure a receive parameter of the second resource.

For beneficial effects of the second aspect, refer to the beneficial effects of the first aspect. Details are not described herein again.

According to a third aspect, this application provides an information reporting method. The method includes: receiving configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the configuration information is further used to configure a third resource, the third resource is associated with the first resource set, and the third resource is a zero power reference signal resource used for interference measurement, receive parameters of the N first resources are the same; measuring a signal strength on the first resource, to obtain a first signal strength; measuring a signal strength on the second resource, to obtain a second signal strength; measuring an interference strength on the third resource, to obtain a first interference strength; and reporting one or more first signal to interference plus noise ratios (SINRs) to the network device, where the first SINR is an SINR obtained based on the first signal strength, the second signal strength, and the first interference strength.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

Based on the method described in the third aspect, the receive parameters of the N first resources are the same, so that the terminal device successfully measures interference on the zero power reference signal resource by using the receive parameter of the first resource.

In a possible implementation, if the configuration information is further used to configure the third resource, the configuration information is further used to indicate that the receive parameters of the N first resources are the same. Based on this possible implementation, the network device indicates to the terminal device that the receive parameters of the N first resources are the same. Alternatively, the terminal device determines, based on whether the third resource is configured based on the configuration information, whether the receive parameters of the N first resources are the same.

In a possible implementation, the identifiers that are of the N first resources and that are in the first resource set is the same or different. In other words, the N first resources are a same resource or different resources.

In a possible implementation, the identifiers that are of the N second resources and that are in the second resource set is the same or different. In other words, the N second resources are a same resource or different resources.

In a possible implementation, receive parameters of the N second resources, the receive parameters of the N first resources, and a receive parameter of the third resource are the same. Alternatively, expressed as: Receive parameters of the N second resources, the receive parameters of the N first resources, and a receive parameter of the third resource are quasi-co-located (QCLed). Alternatively, if the identifiers that are of the N first resources and that are in the first resource set are the same (that is, the N first resources are one resource), further expressed as: Receive parameters of the N second resources, the receive parameter of the first resource, and a receive parameter of the third resource are the same. Alternatively, if the identifiers that are of the N second resources and that are in the second resource set are the same (that is, the N second resources are one resource), further expressed as: Receive parameter of the second resource, the receive parameters of the N first resources, and a receive parameter of the third resource are the same.

With this possible implementation implemented, interference caused by a transmit parameter of the second resource to a transmit parameter and/or the receive parameter of the first resource is accurately measured.

In a possible implementation, the configuration information is further used to configure receive parameters of one or more of the N first resources. Based on this possible implementation, the terminal device performs signal measurement on the first resource and the second resource by using a same receive parameter (that is, the configured receive parameters of the one or more of the N first resources), and perform interference measurement on the third resource.

In a possible implementation, the configuration information is further used to configure the receive parameters of the N first resources. Based on this possible implementation, the terminal device performs signal measurement on the first resource and the second resource by using a same receive parameter (that is, the configured receive parameters of the N first resources), and perform interference measurement on the third resource. If the identifiers that are of the N first resources and that are in the first resource set are the same, further expressed as: The configuration information is further used to configure the receive parameter of the first resource.

In a possible implementation, the configuration information is further used to configure receive parameters of one or more of the N second resources. Based on this possible implementation, the terminal device performs signal measurement on the first resource and the second resource by using a same receive parameter (that is, the configured receive parameters of the one or more of the second resource), and perform interference measurement on the third resource.

In a possible implementation, the configuration information is further used to configure the receive parameters of the N second resources. Based on this possible implementation, the terminal device performs signal measurement on the first resource and the second resource by using a same receive parameter (that is, the configured receive parameters of the N second resources), and perform interference measurement on the third resource. If the identifiers that are of the N second resources and that are in the second resource set are the same, further expressed as: The configuration information is further used to configure the receive parameter of the second resource.

In a possible implementation, the configuration information is further used to configure the receive parameter of the third resource. Based on this possible implementation, the terminal device performs signal measurement on the first resource and the second resource by using a same receive parameter (that is, the configured receive parameter of the third resource), and perform interference measurement on the third resource.

In a possible implementation, the identifiers that are of the N second resources and that are in the second resource set are the same, the receive parameter of the second resource is the same as the receive parameters of the N first resources, and a implementation of measuring a signal strength on the second resource, to obtain a second signal strength is: measuring the signal strength on the second resource once, to obtain one second signal strength. Based on this possible implementation, the terminal measures a plurality of first resources and one second resource by using a same receive parameter, so that measurement load of the terminal device is reduced, and communication overheads of the network device is reduced.

In a possible implementation, the configuration information is further used to configure the receive parameter of the third resource. Based on this possible implementation, the terminal measures a plurality of first resources and one second resource by using a same receive parameter, so that measurement load of the terminal device is reduced, and communication overheads of the network device is reduced.

According to a fourth aspect, this application provides an information reporting method. The method includes: sending configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the configuration information is further used to configure a third resource, the third resource is associated with the first resource set, and the third resource is a zero power reference signal resource used for interference measurement, the configuration information is further used to indicate that receive parameters of the N first resources are the same; sending a first reference signal on the first resource; sending a second reference signal on the second resource; and receiving one or more first signal to interference plus noise ratios (SINRs) reported by the terminal device.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

In a possible implementation, the identifiers that are of the N first resources and that are in the first resource set is the same or different. In other words, the N first resources are a same resource or different resources.

In a possible implementation, the identifiers that are of the N second resources and that are in the second resource set is the same or different. In other words, the N second resources are a same resource or different resources.

In a possible implementation, the configuration information is further used to configure receive parameters of one or more of the N first resources, the configuration information is further used to configure the receive parameters of the N first resources, the configuration information is further used to configure receive parameters of one or more of the N second resources, the configuration information is further used to configure receive parameters of the N second resources, or the configuration information is further used to configure a receive parameter of the third resource.

In a possible implementation, if the identifiers that are of the N first resources and that are in the first resource set are the same, that the configuration information is further used to configure the receive parameters of the N first resources is further expressed as: The configuration information is further used to configure the receive parameter of the first resource. In a possible implementation, if the identifiers that are of the N second resources and that are in the second resource set are the same, that the configuration information is further used to configure the receive parameters of the N second resources is further expressed as: The configuration information is further used to configure the receive parameter of the second resource.

For beneficial effects of the fourth aspect, refer to the beneficial effects of the third aspect. Details are not described herein again.

According to a fifth aspect, this application provides an information reporting method. The method includes: receiving configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the identifiers of the N first resources are the same, the second resource set includes identifiers of N second resources, the identifiers of the N first resources are in a one-to-one correspondence with the identifiers of the N second resources, and N is an integer greater than 1; measuring a signal strength on the first resource, to obtain a first signal strength; measuring signal strengths on the N second resources, to obtain N second signal strengths; and reporting a first signal to interference plus noise ratio SINR to the network device based on the first signal strength and the N second signal strengths. Based on the method described in the first aspect, resource overheads are reduced.

In a possible implementation, receive parameters of the N second resources are the same as a receive parameter of the first resource. Alternatively, expressed as: Receive parameters of the N second resources and a receive parameter of the first resource are quasi-co-located (QCLed). Alternatively, expressed as: The terminal device measures the signal strengths on the N second resources by using a receive parameter of the first resource. With this possible implementation implemented, interference caused by a transmit parameter of the second resource to a transmit parameter and/or the receive parameter of the first resource is accurately measured.

In a possible implementation, a implementation of reporting a first signal to interference plus noise ratio SINR to the network device based on the first signal strength and the N second signal strengths is: determining N SINRs, where an $i^{th}$ SINR in the N SINRs is obtained based on the first signal strength and an $i^{th}$ second signal strength in the N second signal strengths, and i is an integer greater than 0 and less than or equal to N; and reporting one or more first SINRs in the N SINRs to the network device. With this possible implementation implemented, the network device determines interference caused by transmit parameters of one or more second resources to a transmit parameter and/or the receive parameter of the first resource. After the network device determines the interference caused by the transmit parameters of the one or more second resources to the transmit parameter and/or the receive parameter of the first resource, during subsequent data transmission, the network device performs scheduling to avoid simultaneous transmission of beams that have strong mutual interference, or perform simultaneous transmission of a pair of beams that have weak mutual interference.

In a possible implementation, positions of identifiers of first resources in the first resource set are reported to the network device, where the first resources correspond to the one or more first SINRs. Although the identifiers that are of the first resources and that are in the first resource set are the same, second resources used for calculating SINRs are different. Therefore, since the positions of the identifiers of the first resources in the first resource set are reported to the network device, where the first resources correspond to the one or more first SINRs, the network device accurately determines the second resources used for calculating the SINRs.

In a possible implementation, the first SINR is obtained based on a sum of the N second signal strengths and the first signal strength. With this possible implementation implemented, an interference accumulation function is implemented. When an interference environment experienced by the terminal device is complex, the interference measurement is more accurate. Optionally, the first resource set further includes a resource identifier different from the identifier of the first resource, and a position of the identifier of the first resource in the first resource set is further reported to the network device, so that the network device accurately determines the second resources used for calculating the SINRs.

According to a sixth aspect, this application provides an information reporting method. The method includes: sending configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the identifiers of the N first resources are the same, the second resource set includes identifiers of N second resources, the identifiers of the N first resources are in a one-to-one correspondence with the identifiers of the N second resources, and N is an integer greater than 1; sending a first reference signal on the first resource; sending a second reference signal on each of the N second resources; and receiving a first signal to interference plus noise ratio SINR reported by the terminal device.

In a possible implementation, positions of identifiers of first resources in the first resource set is received, where the first resources correspond to one or more first SINRs reported by the terminal device.

In a possible implementation, the first resource set further includes a resource identifier different from the identifier of the first resource, and a position of the identifier of the first resource in the first resource set is received, where the position is reported by the terminal device.

For beneficial effects of the sixth aspect, refer to the beneficial effects of the fifth aspect. Details are not described herein again.

According to a seventh aspect, this application provides an information reporting method. The method includes: receiving configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N second resources are the same, the identifiers of the N first resources are in a one-to-one correspondence with the identifiers of the N second resources, and N is an integer greater than 1; measuring signal strengths on the N first resources, to obtain N first signal strengths; measuring a signal strength on the second resource for N times, to obtain N second signal strengths;

and reporting one or more first signal to interference plus noise ratios (SINRs) to the network device, where the first SINR is an SINR in N SINRs that are obtained based on the N first signal strengths and the N second signal strengths. Based on the method described in the third aspect, resource overheads are reduced.

In a possible implementation, a implementation of measuring signal strengths on the N first resources is: measuring the signal strengths on the N first resources by using receive parameters of the N first resources; and a implementation of measuring a signal strength on the second resource for N times is: measuring the signal strength on the second resource for N times by using the receive parameters of the N first resources. Alternatively, expressed as: A receive parameter of each of the N second resources and a receive parameter of a first resource associated with the second resource are QCLed. Alternatively, expressed as: A receive parameter of each of the N second resources and a receive parameter of a first resource associated with the second resource are the same. With this possible implementation implemented, interference caused by a transmit parameter of the second resource to a transmit parameter and/or the receive parameter of the first resource is accurately measured.

In a possible implementation, a periodicity of the second resource is 1/N of a periodicity of the first resource. In this possible implementation, the network device sends a reference signal of the second resource for N times in one periodicity of the first resource. The periodicity of the second resource is set to 1/N of the periodicity of the first resource, so that duration of a measurement result reporting periodicity is reduced, and a beam training speed is increased.

In a possible implementation, a periodicity of the second resource is the same as a periodicity of the first resource, and a time domain range for measuring the N second signal strengths is less than or equal to a time length of one time unit. Optionally, one time unit is one OFDM symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like. With this possible implementation implemented, duration of a measurement result reporting periodicity is reduced, and a beam training speed is increased.

In a possible implementation, when the receive parameters of the N first resources are the same, the signal strength on the second resource is measured once, to obtain one second signal strength. The first SINR reported to the network device is an SINR in the N SINRs that are obtained based on the N first signal strengths and one second signal strength.

According to an eighth aspect, this application provides an information reporting method. The method includes: sending configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N second resources are the same, the identifiers of the N first resources are in a one-to-one correspondence with the identifiers of the N second resources, and N is an integer greater than 1; sending a first reference signal on each of the N first resources; sending a second reference signal on the second resource; and receiving one or more first signal to interference plus noise ratios (SINRs) reported by the terminal device.

In a possible implementation, a periodicity of the second resource is 1/N of a periodicity of the first resource.

In a possible implementation, a periodicity of the second resource is the same as a periodicity of the first resource.

For beneficial effects of the eighth aspect, refer to the beneficial effects of the seventh aspect. Details are not described herein again.

According to a ninth aspect, this application provides an information reporting method. The method includes: receiving configuration information sent by a network device, where the configuration information is used to configure a first resource set, resources corresponding to resource identifiers in the first resource set are used for channel measurement, the first resource set includes identifiers of N first resources, the identifiers of the N first resources are the same, and N is an integer greater than 1; measuring a signal strength on the first resource for N times, to obtain N signal strengths; and reporting a first signal strength in the N signal strengths to the network device. Based on the method described in the fifth aspect, resource overheads are reduced.

In a possible implementation, a time domain range for the N times of measurement is less than or equal to a time length of one time unit. Optionally, one time unit is one OFDM symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like. With this possible implementation implemented, duration of a measurement result reporting periodicity is reduced, and a beam training speed is increased.

In a possible implementation, a time domain measurement range for each of the N times of measurement is less than or equal to $N_{IFFT}/N$, and $N_{IFFT}$ is a time length of one time unit.

In a possible implementation, a time domain measurement range for each of the N times of measurement is less than or equal to $N_{IFFT}/N-N_{CP}/N$, $N_{CP}$ is a time length of a cyclic prefix, and $N_{IFFT}$ is a time length of one time unit. The cyclic prefix is a guard interval. Therefore, the time domain measurement range for each of the N times of measurement is less than or equal to $N_{IFFT}/N-N_{CP}/N$.

In a possible implementation, the N times of measurement are performed after the cyclic prefix.

In a possible implementation, the configuration information further includes a repetition factor, the repetition factor is off, and a position of an identifier of a first resource in the first resource set is reported to the network device, where the first resource corresponds to the first signal strength, so that the network device determines a transmit parameter used to measure the first signal strength.

According to a tenth aspect, this application provides an information reporting method. The method includes: sending configuration information to a terminal device, where the configuration information is used to configure a first resource set, resources corresponding to resource identifiers in the first resource set are used for channel measurement, the first resource set includes identifiers of N first resources, the identifiers of the N first resources are the same, and N is an integer greater than 1; sending a reference signal on the first resource; and receiving a first signal strength that is in N signal strengths and that is reported by the terminal device.

In a possible implementation, the configuration information further includes a repetition factor, the repetition factor is off, and a implementation of sending a reference signal on the first resource is: sending a reference signal on the first resource for N times by using N transmit parameters.

In a possible implementation, a time domain range for sending a reference signal for N times by using the N transmit parameters is less than or equal to a time length of one time unit. Optionally, one time unit is one OFDM symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like.

In a possible implementation, a time domain range for sending a reference signal each time is less than or equal to $N_{IFFT}/N$, and $N_{IFFT}$ is a time length of one time unit.

In a possible implementation, a time domain range for sending a reference signal each time is less than or equal to $N_{IFFT}/N-N_{CP}/N$, $N_{CP}$ is a time length of a cyclic prefix, and $N_{IFFT}$ is a time length of one time unit.

In a possible implementation, sending a reference signal for N times by using the N transmit parameters is performed after the cyclic prefix.

In a possible implementation, the configuration information further includes a repetition factor, the repetition factor is off, and a position of an identifier of a first resource in the first resource set is received, where the first resource corresponds to the first signal strength reported by the terminal device.

For beneficial effects of the tenth aspect, refer to the beneficial effects of the ninth aspect. Details are not described herein again.

According to an eleventh aspect, a communication apparatus is provided. The apparatus is a terminal device, an apparatus in the terminal device, or an apparatus that is used together with the terminal device. The communication apparatus alternatively is a chip system. The communication apparatus performs the method according to the first aspect, the third aspect, the fifth aspect, the seventh aspect, or the ninth aspect. A function of the communication apparatus is implemented by hardware, or is implemented by hardware executing corresponding software. The hardware or software includes one or more units corresponding to the foregoing function. The unit is software and/or hardware. For operations performed by the communication apparatus and beneficial effects, refer to the method described in the first aspect, the third aspect, the fifth aspect, the seventh aspect, or the ninth aspect and the beneficial effects thereof. Repeated parts are not described again.

According to a twelfth aspect, a communication apparatus is provided. The apparatus is a terminal device, an apparatus in the terminal device, or an apparatus that is used together with the terminal device. The communication apparatus alternatively is a chip system. The communication apparatus performs the method according to the second aspect, the fourth aspect, the sixth aspect, the eighth aspect, or the tenth aspect. A function of the communication apparatus is implemented by hardware, or is implemented by hardware executing corresponding software. The hardware or software includes one or more units corresponding to the foregoing function. The unit is software and/or hardware. For operations performed by the communication apparatus and beneficial effects thereof, refer to the method described in the second aspect, the fourth aspect, the sixth aspect, the eighth aspect, or the tenth aspect and the beneficial effects thereof. Repeated parts are not described again.

According to a thirteenth aspect, an embodiment of this application provides a communication apparatus. The communication apparatus includes a processor, and when the processor invokes a computer program in a memory, the method according to any one of the first aspect to the tenth aspect is performed.

According to a fourteenth aspect, an embodiment of this application provides a communication apparatus. The communication apparatus includes a processor and a memory. The memory is configured to store computer-executable instructions. The processor is configured to execute the computer-executable instructions stored in the memory, to enable the communication apparatus to perform the method according to any one of the first aspect to the tenth aspect.

According to a fifteenth aspect, an embodiment of this application provides a communication apparatus. The communication apparatus includes a processor, a memory, and a transceiver. The transceiver is configured to receive a signal or send a signal. The memory is configured to store program code. The processor is configured to invoke the program code from the memory to perform the method according to any one of the first aspect to the tenth aspect.

According to a sixteenth aspect, an embodiment of this application provides a communication apparatus. The communication apparatus includes a processor and an interface circuit. The interface circuit is configured to receive code instructions and transmit the code instructions to the processor. The processor runs the code instructions to perform the method according to any one of the first aspect to the tenth aspect.

According to a seventeenth aspect, an embodiment of this application provides a computer-readable storage medium. The computer-readable storage medium is configured to store instructions. When the instructions are executed, the method according to any one of the first aspect to the tenth aspect is implemented.

According to an eighteenth aspect, an embodiment of this application provides a computer program product including instructions. When the instructions are executed, the method according to any one of the first aspect to the tenth aspect is implemented.

BRIEF DESCRIPTION OF DRAWINGS

FIG. 1 is a schematic diagram of an existing related configuration of measurement and reporting of a reference signal used for beam training;

FIG. 5 is a schematic diagram of a related configuration of measurement and reporting of a reference signal used for beam training according to an embodiment of this application;

FIG. 8 is a schematic diagram of another related configuration of measurement and reporting of a reference signal used for beam training according to an embodiment of this application;

DESCRIPTION OF EMBODIMENTS

Figure 2:
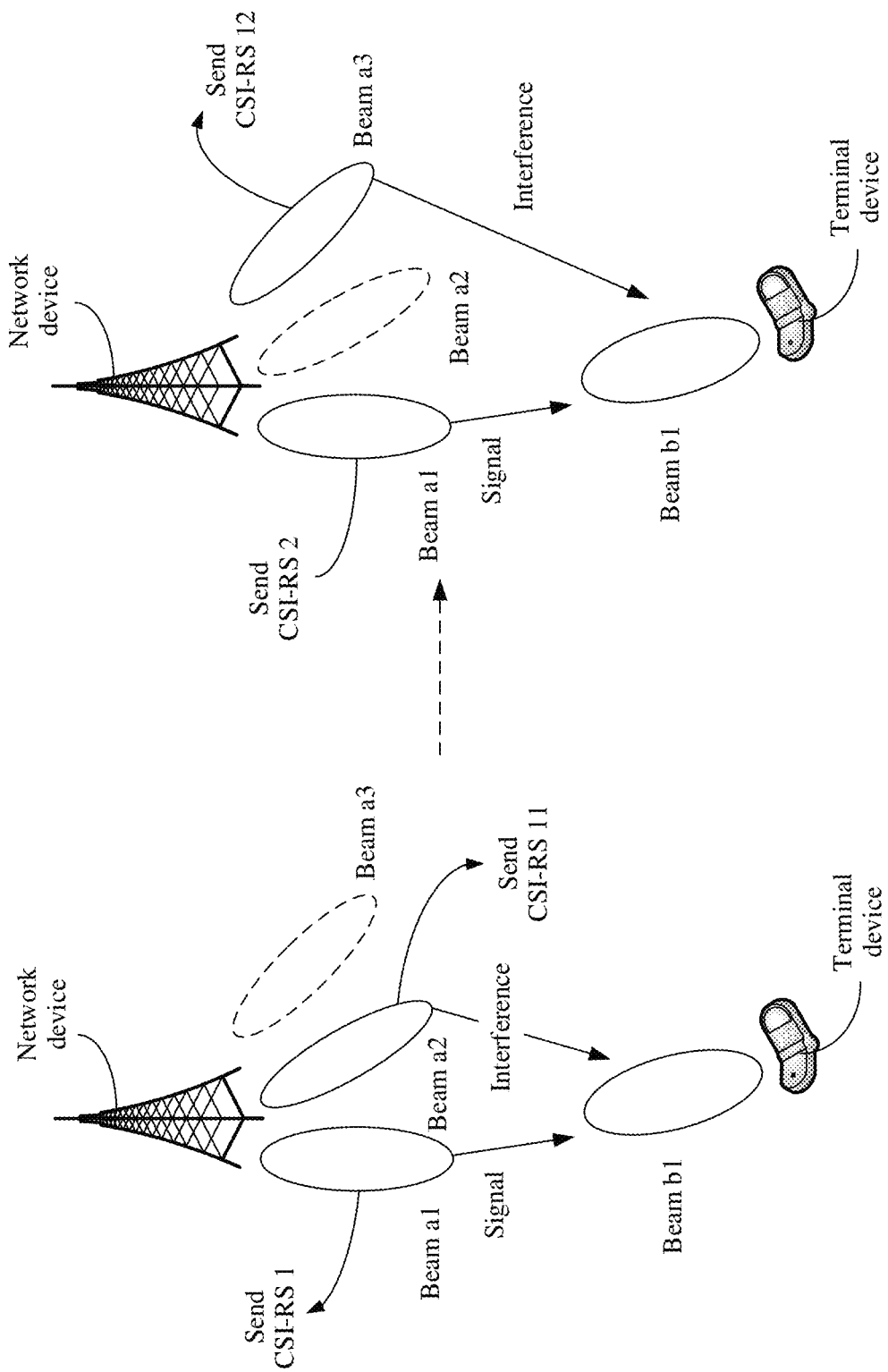
FIG. 2 is a schematic diagram of existing SINR measurement.

To make objectives, technical solutions, and advantages of this application clearer, the following further describes this application in detail with reference to accompanying drawings.

In the specification, claims, and accompanying drawings of this application, the terms "first", "second", and so on are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

"Embodiment" mentioned in this specification means that a particular characteristic, structure, or feature described with reference to the embodiments are included in at least one embodiment of this application. The phrase occurred at different positions in the specification does not necessarily refer to a same embodiment, or an independent or alternative embodiment exclusive of another embodiment. A person skilled in the art understands, in explicit and implicit manners, that an embodiment described in this application is combined with another embodiment.

In this application, "at least one (item)" means one or more, "a plurality of" means two or more, "at least two (items)" means two, three, or more, and "and/or" is used to describe a correspondence relationship between corresponding objects, and indicates that there is three relationships. For example, "A and/or B" indicates that A exists, B exists, and both A and B exist, where A and B is singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one (piece) of a, b, or c represents: a, b, c, "a and b", "a and c", "b and c", or "a, b, and c", where a, b, and c is singular or plural.

A beam management mechanism based on an L1-SINR (layer 1-SINR) is introduced to 3GPP R16. To perform the beam management based on an L1-SINR, the release allows dedicated configuration of an interference measurement resource (IMR). There is a one-to-one correspondence between an IMR and a channel measurement resource (CMR), that is, one CMR is configured with one IMR. The IMR resource is used by a terminal device for interference and noise measurement. The CMR resource is used by the terminal device for channel measurement. The IMR resource and the CMR resource is collectively referred to as a CSI-RS resource.

The following describes in detail an existing related configuration of measurement and reporting of a reference signal used for beam training.

For example, as shown in FIG. 1, a network device configures that a reporting quantity of a reporting configuration (ReportConfig #1) is a CRI-SINR, and the reporting configuration (ReportConfig #1) corresponds to two resource settings (ResourceConfig): a channel measurement resource setting (ResourceConfig #1) and an interference measurement resource setting (ResourceConfig #2). A function of the channel measurement resource setting is marked as channel measurement (resourcesForChannelMeasurement). A function of the interference measurement resource setting is marked as interference measurement (resourcesForInterferenceMeasurement).

RsourceConfig #1 includes a resource set list (ResourceSetList), and the resource set list includes M ($\geq 1$) resource sets, for example, includes resource set #1 (resourceset #1). RsourceConfig #2 further includes a resource set list (ResourceSetList). The resource set list includes M ($\geq 1$) resource sets, for example, resource set #2 (resourceset #2). Resource set #1 (resourceset #1) includes Y ($\geq 1$) CMR resources. For example, in FIG. 1, resource set #1 includes CSI-RS resource #1 (CSI-RS resource #1) and CSI-RS resource #2 (CSI-RS resource #2). Resource set #2 includes Y ($\geq 1$) IMR resources. For example, in FIG. 1, resource set #2 (resourceset #2) includes CSI-RS resource #11 (CSI-RS resource #11) and CSI-RS resource #12 (CSI-RS resource #12). CSI-RS resource #1 corresponds to CSI-RS resource #11, and CSI-RS resource #2 corresponds to CSI-RS resource #12.

However, the resource setting shown in FIG. 1 increases overheads of CMR resources. For example, as shown in FIG. 2, CSI-RS resource #1 and CSI-RS resource #2 correspond to same transmit parameters, and the transmit parameters corresponding to CSI-RS resource #1 and CSI-RS resource #2 are beam a1. CSI-RS resource #1 and CSI-RS resource #2 further correspond to same receive parameters, and the receive parameters corresponding to CSI-RS resource #1 and CSI-RS resource #2 are beam b1.

A transmit parameter corresponding to CSI-RS resource #11 is beam a2, and a transmit parameter corresponding to CSI-RS resource #12 is beam a3.

The network device sends a reference signal CSI-RS 1 on CSI-RS resource #1 by using beam a1, and sends a reference signal CSI-RS 11 on CSI-RS resource #11 by using beam a2. The terminal device measures signal strength 1 of CSI-RS 1 by using beam b1, and measures signal strength 2 of CSI-RS 11 by using beam b1. The terminal device determines a ratio of signal strength 1 to signal strength 2 as SINR 1, and reports SINR 1 to the network device. Then, the network device sends a reference signal CSI-RS 2 on CSI-RS resource #2 by using beam a1, and sends a reference signal CSI-RS 12 on CSI-RS resource #12 by using beam a3. The terminal device measures signal strength 3 of CSI-RS 2 by using beam b1, and measures signal strength 4 of CSI-RS 12 by using beam b1. The terminal device determines a ratio of signal strength 3 to signal strength 4 as SINR 2, and reports SINR 2 to the network device.

In other words, the resource setting in FIG. 1 is used to measure interference of beam a2 and beam a3 to a same pair of beams (beam a1 and beam b1). In this case, the terminal device actually needs to perform channel measurement once. To be specific, to configure that one CMR resource corresponds to a plurality of IMR resources. For example, resource set #1 (resourceset #1) includes CSI-RS resource #1, and resource set #2 (resourceset #2) includes CSI-RS resource #11 and CSI-RS resource #12. In this way, the CSI-RS resource #1 corresponds to both CSI-RS resource #11 and CSI-RS resource #12. However, because the protocol stipulates that a CMR resource and an IMR resource need to be in a one-to-one correspondence, and one CMR resource is unable to correspond to a plurality of IMR resources, in an existing correspondence between a CMR resource and an IMR resource, when interference caused by a plurality of beams to a same pair of beams is measured, different CMR resources are usually configured for different IMRs. CMR resource overheads are increased in this case.

Therefore, to reduce the CMR resource overheads, embodiments of this application provide an information reporting method. To better understand embodiments of this application, the following describes a system architecture used in embodiments of this application.

The method provided in embodiments of this application is applied to various communication systems, for example, an Internet of Things (IoT) system, a narrow band Internet of Things (NB-IoT) system, a long term evolution (LTE) system, a 5th-generation (5G) communication system, an LTE-5G hybrid architecture, a 5G new radio (NR) system, and a new communication system emerging in future communication development.

Figure 3:
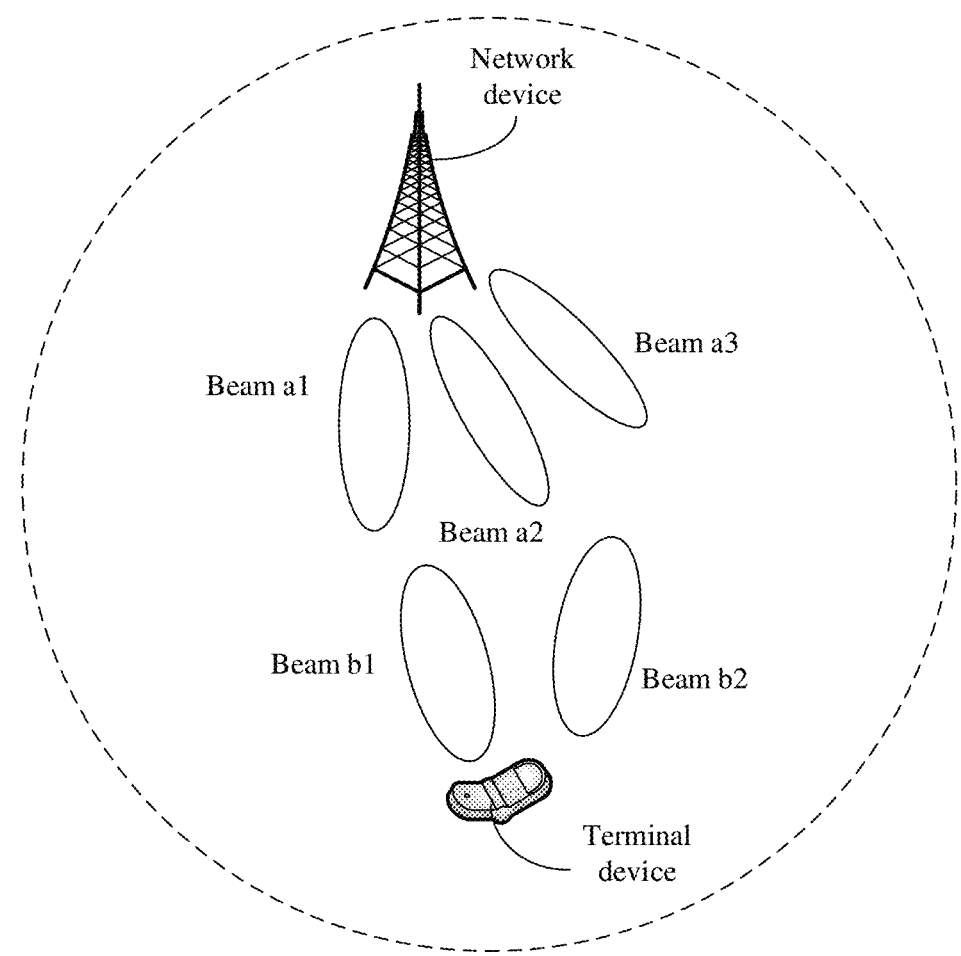
FIG. 3 is a schematic diagram of a communication system according to an embodiment of this application.

FIG. 3 is a schematic diagram of an architecture of a communication system according to an embodiment of this application. The solutions in this application are applicable to the communication system. The communication system includes at least one network device and at least one terminal device. For example, in FIG. 3, the communication system includes one network device and one terminal device. As shown in FIG. 3, the network device and the terminal device communicates with each other by using beams. Both the network device and the terminal device generates a plurality of beams. In FIG. 3, for example, the network device transmits beam a1 to beam a3, and receive beams of the terminal device include beam b1 and beam b2.

The network device in embodiments of this application is an entity on a network side that is configured to transmit or receive a signal, is configured to mutually convert a received over-the-air frame and an internet protocol (IP) packet, and serves as a router between a terminal device and a remaining part of an access network. The remaining part of the access network includes an IP network and the like. The network device further coordinates attribute management of an air interface. For example, the network device is an evolved NodeB (eNB or e-NodeB) in LTE, a new radio controller (NR controller), a gNodeB (gNB) in a 5G system, a centralized unit, a new radio base station, a radio remote module, a micro base station, a relay, a distributed unit, a transmission reception point (TRP), a transmission point (TP), or any other radio access device. However, embodiments of this application are not limited thereto.

The terminal device in embodiments of this application is an entity on a user side that is configured to receive or transmit a signal. The terminal device is a device that provides a user with voice and/or data connectivity, for example, a handheld device or a vehicle-mounted device having a wireless connection function. The terminal device alternatively is another processing device connected to a wireless modem. The terminal device communicates with a radio access network (RAN). The terminal device is further referred to as a wireless terminal, a subscriber unit, a subscriber station, a mobile station, a mobile console, a remote station, an access point, a remote terminal, an access terminal, a user terminal, a user agent, a user device, user equipment (UE), or the like. The terminal device is a mobile terminal, for example, a mobile phone (or referred to as a "cellular" phone), and a computer that has a mobile terminal. For example, the terminal device is a portable, pocket-sized, handheld, computer built-in, or a vehicle-mounted mobile apparatus, which exchanges a voice and/or data with the radio access network. For example, the terminal device alternatively is a device such as a personal communications service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, embodiments of this application are not limited thereto.

The following further describes in detail the information reporting method provided in embodiments of this application.

Figure 4:
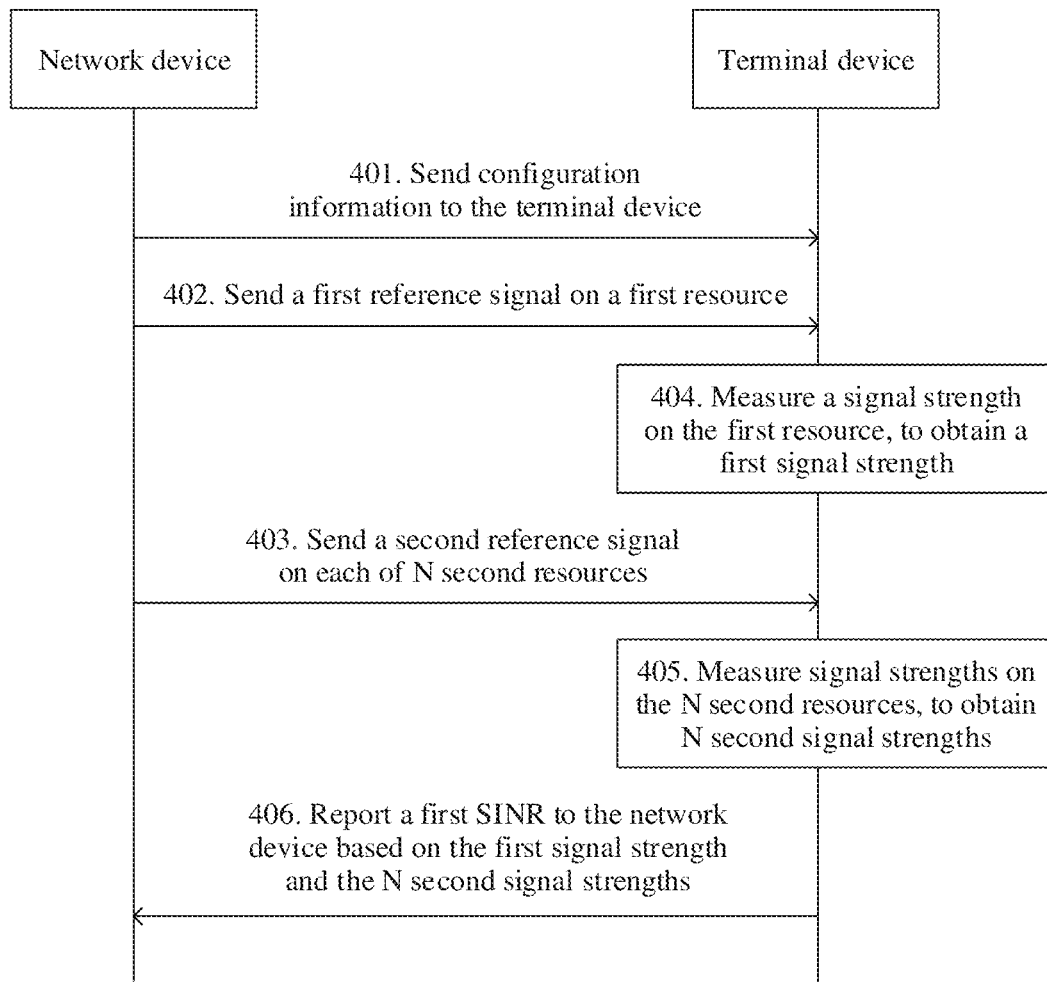
FIG. 4 is a schematic flowchart of an information reporting method according to an embodiment of this application.

FIG. 4 is a schematic flowchart of an information reporting method according to an embodiment of this application. As shown in FIG. 4, the information reporting method includes the following step 401 to step 406. The method shown in FIG. 4 is performed by a network device and a terminal device, or is performed by a chip in the network device and a chip in the terminal device. In FIG. 4, an example in which the method is performed by the network device and the terminal device is used for description. Execution bodies of information reporting methods shown in other accompanying drawings in embodiments of this application are similar to what are described herein. Details are not described below again.

401. The network device sends configuration information to the terminal device.

The configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the identifiers of the N first resources are the same, the second resource set includes identifiers of N second resources, the identifiers of the N first resources are in a one-to-one correspondence (association) with the identifiers of the N second resources, and N is an integer greater than 1.

The first resource set includes the identifiers of the N first resources, and the identifiers of the N first resources are the same. Therefore, the first resource set includes N same first resources, or the first resource set includes one first resource.

The identifiers that are of the N second resources and that are included in the second resource set is the same or different. If the identifiers of the N second resources are the same, the second resource set includes N same second resources. If the identifiers of the N second resources are different, the second resource set includes N different second resources.

For example, as shown in FIG. 5, the first resource set is a resource set corresponding to resource set #1 (resourceset #1). The second resource set is a resource set corresponding to resource set #2 (resourceset #2). The first resource set includes two same identifiers of first resources, and the identifiers of the first resources are CSI-RS resources #1. The second resource set includes two identifiers of second resources: CSI-RS resource #11 and CSI-RS resource #12. First CSI-RS resource #1 corresponds to CSI-RS resource #11, and second CSI-RS resource #1 corresponds to CSI-RS resource #12. That is, the first resource set includes two same first resources, and the second resource set includes two different second resources.

Optionally, the configuration information further includes a repetition factor. When the repetition factor is on, transmit parameters of the N first resources are a same transmit parameter. When the repetition factor is off, transmit parameters of the N first resources are not a same transmit parameter. For example, as shown in FIG. 5, the repetition factor is repetition, and the repetition factor is on. "Repetition: ON" indicates that the repetition factor is on. "Repetition: OFF" indicates that the repetition factor is off.

402. The network device sends a first reference signal on the first resource.

403. The network device sends a second reference signal on each of the N second resources.

In this embodiment of this application, after the network device sends the configuration information to the terminal device, the network device sends the first reference signal on the first resource and send the second reference signal on each of the N second resources.

404. The terminal device measures a signal strength on the first resource, to obtain a first signal strength.

405. The terminal device measures signal strengths on the N second resources, to obtain N second signal strengths.

In this embodiment of this application, after receiving the configuration information sent by the network device, the terminal device measures the first signal strength on the first resource, and measure the signal strengths on the N second resources, to obtain the N second signal strengths.

In a possible implementation, receive parameters of the N second resources are the same as a receive parameter of the first resource. Alternatively, expressed as: Receive parameters of the N second resources and a receive parameter of the first resource are quasi-co-located (QCLed). Alternatively, expressed as: The terminal device measures the signal strengths on the N second resources by using a receive parameter of the first resource. With this possible manner implemented, interference caused by a transmit parameter of the second resource to a transmit parameter and/or the receive parameter of the first resource is accurately measured.

Figure 6:
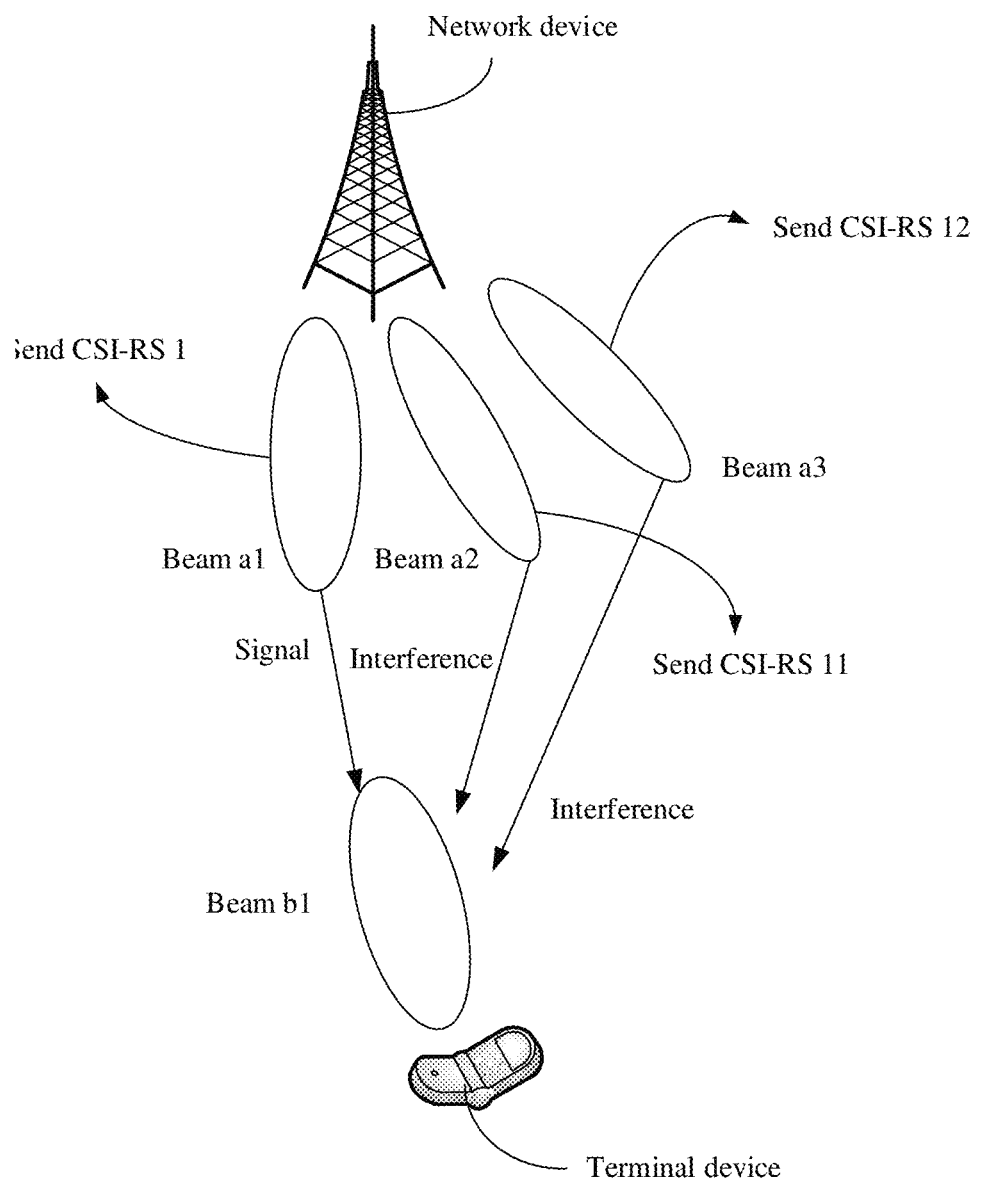
FIG. 6 is a schematic diagram of an SINR measurement method according to an embodiment of this application.

For example, measurement performed by the terminal device in one measurement result reporting periodicity is used as an example for description. As shown in FIG. 6, one measurement result reporting periodicity is 10 ms. A periodicity of CSI-RS resource #1 is 10 ms. A periodicity of CSI-RS resource #11 is 10 ms. A periodicity of CSI-RS resource #12 is 10 ms. In one measurement result reporting periodicity, the terminal device measures a total of three reference signals: CSI-RS 1 sent on a resource corresponding to CSI-RS resource #1, CSI-RS 11 sent on a resource corresponding to CSI-RS resource #11, and CSI-RS 12 sent on a resource corresponding to CSI-RS resource #12. A transmit parameter of CSI-RS resource #1 is beam a1, a transmit parameter of CSI-RS resource #11 is beam a2, and a transmit parameter of CSI-RS resource #12 is beam a3. A receive parameter of CSI-RS resource #1 is beam b1. The terminal device measures, by using beam b1, a signal strength of CSI-RS 1 on the resource corresponding to CSI-RS resource #1, to obtain first signal strength P1. The terminal device measures, by using beam b1, a signal strength of CSI-RS 11 on the resource corresponding to CSI-RS resource #11, to obtain second signal strength P11. The terminal device measures, by using beam b1, a signal strength of CSI-RS 12 on the resource corresponding to CSI-RS resource #12, to obtain second signal strength P12. The terminal device performs channel measurement once in one measurement result reporting periodicity.

In a possible implementation, the signal strength is signal receive power, signal receive energy, or the like.

406. The terminal device reports a first SINR to the network device based on the first signal strength and the N second signal strengths.

In this embodiment of this application, after measuring the first signal strength and the N second signal strengths, the terminal device reports the first SINR to the network device based on the first signal strength and the N second signal strengths.

The following describes two implementations of reporting, by the terminal device, the first SINR to the network device based on the first signal strength and the N second signal strengths.

Manner 1: The terminal device determines N SINRs, where an $i^{th}$ SINR in the N SINRs is obtained based on the first signal strength and an $i^{th}$ second signal strength in the N second signal strengths, and i is an integer greater than 0 and less than or equal to N; and the terminal device reports one or more first SINRs in the N SINRs to the network device.

For example, the terminal device measures first signal strength P1, second signal strength P11, and second signal strength P12. The terminal device determines two SINRs. SINR 1=P1/(P11+N1). SINR 2=P1/(P12+N2). N1 and N2 are noise power. N1 and N2 is the same or different. The terminal device determines, based on a quantity of reported beams that is predefined in a protocol or that is configured by the network device, a quantity of SINRs to be reported. For example, if the quantity of reported beams that is predefined in the protocol or that is configured by the network device is 2, the terminal device reports SINR 1 and SINR 2 to the network device. Alternatively, if the quantity of reported beams that is predefined in the protocol or that is configured by the network device is 1, the terminal device reports a maximum value or a minimum value of SINR 1 and SINR 2 to the network device.

With Manner 1 implemented, the network device determines interference caused by transmit parameters of one or more second resources to the transmit parameter and/or the receive parameter of the first resource. After the network device determines the interference caused by the transmit parameters of the one or more second resources to the transmit parameter and/or the receive parameter of the first resource, during subsequent data transmission, the network device performs scheduling to avoid simultaneous transmission of beams that have strong mutual interference, or perform simultaneous transmission of a pair of beams that have weak mutual interference.

Optionally, the network device further indicates the terminal device to report a maximum SINR or a minimum SINR. Alternatively, the network device indicates the terminal device to report beams with strong mutual interference or beams with weak mutual interference, for example, indicate the terminal device to report an SINR greater than a preset threshold or less than a preset threshold.

In a possible implementation, the terminal device further reports positions of identifiers of first resources in the first resource set to the network device, where the first resources correspond to the one or more first SINRs. For example, if the terminal device reports SINR 1 and SINR 2 to the network device, the terminal device reports, to the network device, that CSI-RS resource #1 corresponding to SINR 1 is located at the first position in the first resource set, and CSI-RS resource #1 corresponding to SINR 2 is located at the second position in the first resource set.

Although the identifiers that are of the first resources and that are in the first resource set are the same, second resources used for calculating SINRs are different. Therefore, since the positions of the identifiers of the first resources in the first resource set are reported to the network device, where the first resources correspond to the one or more first SINRs, the network device accurately determines the second resources used for calculating the SINRs.

A position of a first resource corresponding to the first SINR in the first resource set is indicated by using X bits, $X=\lceil \log_2 \Sigma_{i=1}^{K} N_i \rceil$, K is a quantity of different resource identifiers in the first resource set, and $N_i$ is a quantity of repetition times of an $i^{th}$ resource identifier in the K resource identifiers. $\Sigma_{i=1}^{K} N_i$ is a total quantity of identifiers included in the first resource set. For example, in a configuration shown in FIG. 5, K is 1. $N_i$ is 2. Therefore, $\Sigma_{i=1}^{K} N_i$ is 2. Therefore, the position of the first resource corresponding to the first SINR in the first resource set is indicated by using one bit. For example, if a bit value is 0, the first resource corresponding to the first SINR is located at the first position in the first resource set; or if a bit value is 1, the first resource corresponding to the first SINR is located at the second position in the first resource set.

Manner 2: The first SINR is obtained based on a sum of the N second signal strengths and the first signal strength. In Manner 2, the terminal device obtains one SINR based on the first signal strength and the N second signal strengths. For example, the first SINR=P1/(P11+P12+N1). With Manner 2 implemented, an interference accumulation function is implemented. When an interference environment experienced by the terminal device is complex, the interference measurement is more accurate. For example, when communicating with a target terminal device by using one serving beam, the network device further communicates with another terminal device by using another beam. The target terminal device is affected by a plurality of interference beams. In this case, the network device simulates transmission of the plurality of interference beams on a plurality of second resources, and the target terminal device accumulates interference detected on the plurality of second resources.

Following RANI guidance, support of option 2a (that is, one CMR is associated with more than one IMR) has no RRC impact, which means that the base station configures a list of N CMRs and another list of N IMRs, and the CMRs and the IMRs are 1:1 mapped. As a solution, the list of N CMRs (N CMRs in the list) are configured with the same CSI-RS resource identifier, which indicates implicitly that the terminal adopts option 2a to calculate the interference based on accumulating measurement results of N associated IMRs. Proposal X: Support option 2a (that is, one CMR is associated with more than one IMR) for L1-SINR report, by configuring a list of CMR resources with the same CSI-RS resource ID. (Following previous RANI guidance, support of option 2a has no RRC impact, which means that gNB configures a list of N CMR(s) and another list of N IMR(s), and they are 1:1 mapped. As a compromised solution, the list of CMR(s) are configured with the same CSI-RS resource ID, which indicates implicitly that UE adopts option 2a to calculate the interference based on accumulating measurement of the associated N IMR(s). Proposal X: Support option 2a (1 CMR associates with more than 1 IMR) for L1-SINR report, by configuring a list of CMRs with the same CSI-RS resource ID.)

In a possible implementation, if identifiers in the first resource set are the same, in Manner 2, the terminal device is unable to report the position of the first resource in the first resource set to the network device.

In a possible implementation, if the first resource set further includes a resource identifier different from the identifier of the first resource, in Manner 2, the terminal device reports the position of the first resource in the first resource set to the network device. For example, the position of the first resource in the first resource set is indicated by using X bits, where $X=\lceil \log_2 K \rceil$, and K is a quantity of different resource identifiers in the first resource set. For example, in FIG. 5, in addition to two CSI-RS resources #1, the first resource set further includes two CSI-RS resources #2. In this case, K is 2, and X is 1.

In a possible implementation, the terminal device reports the first SINR in Manner 1 or Manner 2 above, as predefined in a protocol or as indicated by the network device.

In a possible implementation, the terminal device reports capability information, and the capability information indicates whether the terminal device supports the method described in the embodiment corresponding to FIG. 4.

In a possible implementation, the terminal device performs the method described in the embodiment corresponding to FIG. 4, as predefined in a protocol or as indicated by the network device.

In the method described in FIG. 4, the network device configures, in the first resource set, the same identifiers of the N first resources, and configures, in the second resource set, the identifiers of the N first resources. The identifiers of the N first resources are in a one-to-one correspondence with the identifiers of the N second resources. Therefore, with the method described in FIG. 4 implemented, resource overheads are reduced.

The foregoing embodiment describes how to reduce overheads of CMR resources. The following describes how to reduce overheads of IMR resources with reference to FIG. 7.

Figure 7:
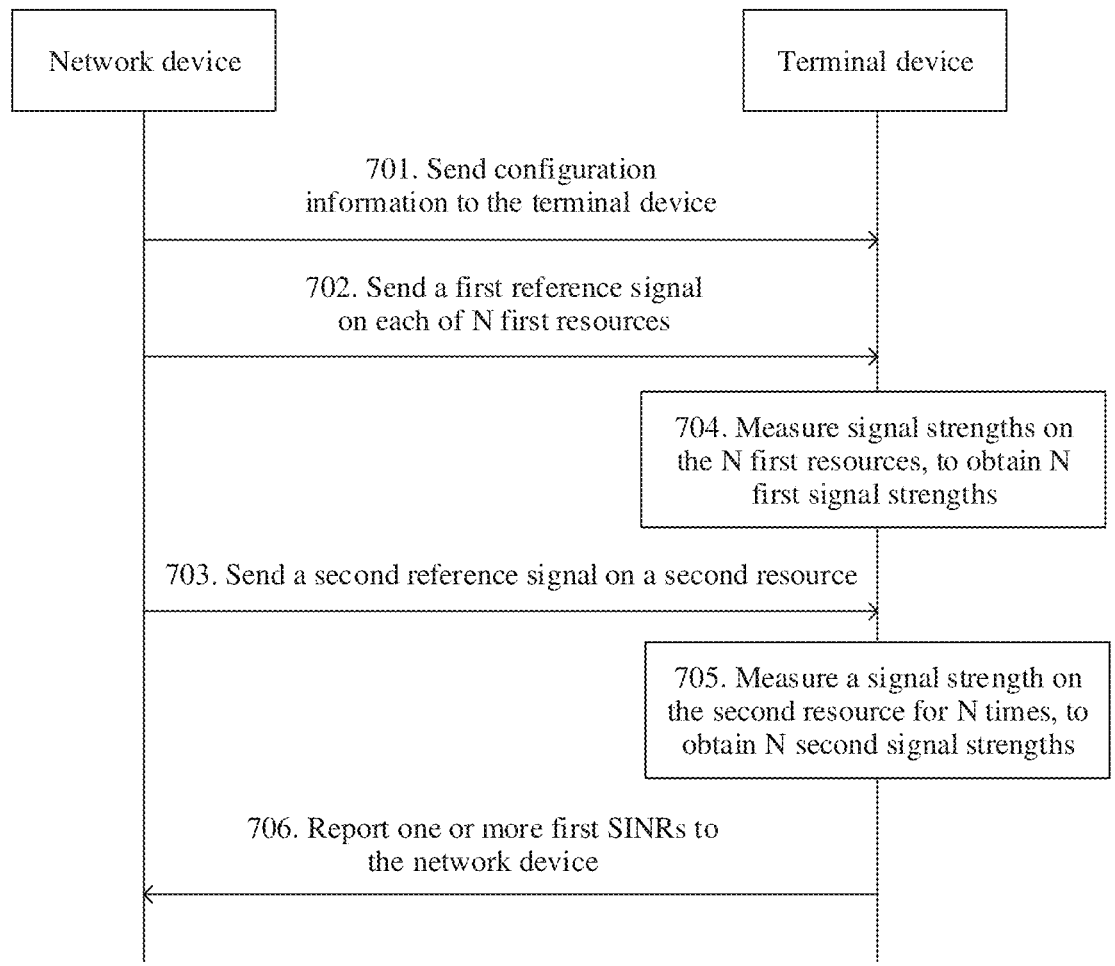
FIG. 7 is a schematic flowchart of another information reporting method according to an embodiment of this application.

FIG. 7 is a schematic flowchart of another information reporting method according to an embodiment of this application. As shown in FIG. 7, the information reporting method includes the following step 701 to step 706. The method shown in FIG. 7 is performed by a network device and a terminal device, or is performed by a chip in the network device and a chip in the terminal device. In FIG. 7, an example in which the method is performed by the network device and the terminal device is used for description. Execution bodies of information reporting methods shown in other accompanying drawings in embodiments of this application are similar to what are described herein. Details are not described below again.

701. The network device sends configuration information to the terminal device.

The configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N second resources are the same, the identifiers of the N first resources are in a one-to-one correspondence with the identifiers of the N second resources, and N is an integer greater than 1.

The second resource set includes the identifiers of the N second resources, and the identifiers of the N second resources are the same. Therefore, the second resource set includes N same second resources, or the second resource set includes one second resource.

The identifiers that are of the N first resources and that are included in the first resource set is the same or different. If the identifiers of the N first resources are the same, the first resource set includes N same first resources. If the identifiers of the N first resources are different, the first resource set includes N different first resources.

For example, as shown in FIG. 8, the first resource set is a resource set corresponding to resource set #1 (resourceset #1). The second resource set is a resource set corresponding to resource set #2 (resourceset #2). The first resource set includes two identifiers of first resources: CSI-RS resource #1 and CSI-RS resource #2. The second resource set includes two same identifiers of second resources, and the identifiers of the second resource are CSI-RS resources #11. CSI-RS resource #1 corresponds to first CSI-RS resource #11, and CSI-RS resource #2 corresponds to second CSI-RS resource #11. That is, the first resource set includes two different first resources, and the second resource set includes two same second resources.

Optionally, the configuration information further includes a repetition factor. When the repetition factor is on, indicating that transmit parameters of the N first resources are a same transmit parameter. When the repetition factor is off, indicating that transmit parameters of the N first resources are not a same transmit parameter. For example, as shown in FIG. 8, the repetition factor is repetition, and the repetition factor is off. "Repetition: ON" indicates that the repetition factor is on. "Repetition: OFF" indicates that the repetition factor is off.

702. The network device sends a first reference signal on each of the N first resources.

703. The network device sends a second reference signal on the second resource.

In this embodiment of this application, after the network device sends the configuration information to the terminal device, the network device sends the first reference signal on each of the N first resources and send the second reference signal on the second resource.

704. The terminal device measures signal strengths on the N first resources, to obtain N first signal strengths.

705. The terminal device measures a signal strength on the second resource for N times, to obtain N second signal strengths.

In this embodiment of this application, after receiving the configuration information sent by the network device, the terminal device measures the signal strengths on the N first resources, to obtain the N first signal strengths, and measure the signal strength on the second resource for N times, to obtain the N second signal strengths.

In a possible implementation, a implementation of measuring, by the terminal device, signal strengths on the N first resources is: measuring the signal strengths on the N first resources by using receive parameters of the N first resources; and a implementation of measuring, by the terminal device, a signal strength on the second resource for N times is: measuring the signal strength on the second resource for N times by using the receive parameters of the N first resources.

Alternatively, expressed as: A receive parameter of each of the N second resources and a receive parameter of a first resource associated with the second resource are QCLed. Alternatively, expressed as: A receive parameter of each of the N second resources and a receive parameter of a first resource associated with the second resource are the same.

In a possible implementation, a periodicity of the second resource is 1/N of a periodicity of the first resource. In this possible implementation, the network device sends a reference signal for N times on the second resource in one periodicity of the first resource. The periodicity of the second resource is set to 1/N of the periodicity of the first resource, so that duration of a measurement result reporting periodicity is reduced, and a beam training speed is increased.

Figure 9:
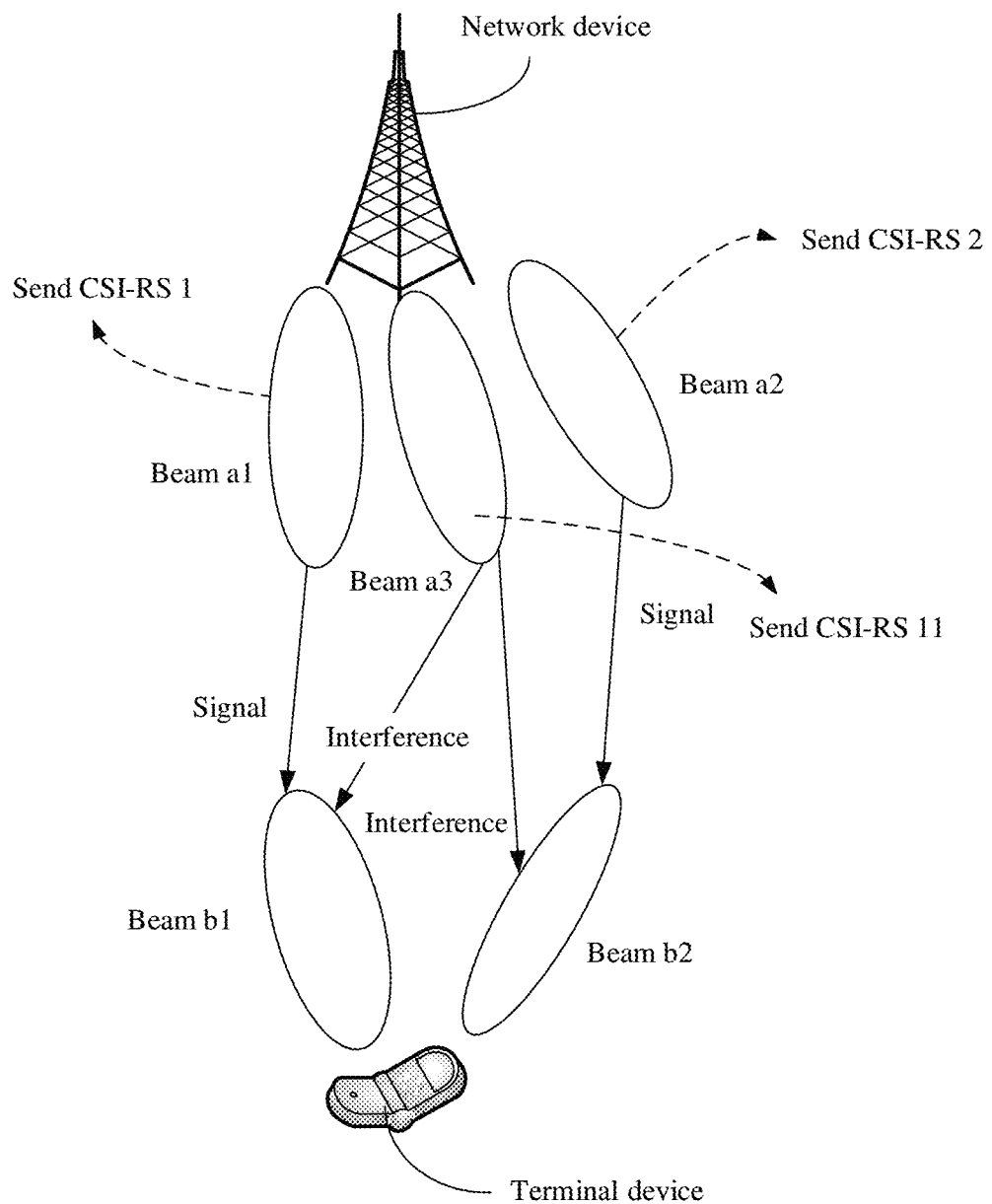
FIG. 9 is a schematic diagram of another SINR measurement method according to an embodiment of this application.

For example, measurement performed by the terminal device in one measurement result reporting periodicity is used as an example for description. As shown in FIG. 9, transmit parameters of CSI-RS resource #1 and CSI-RS resource #2 are different, and receive parameters of CSI-RS resource #1 and CSI-RS resource #2 are different. Periodicities of CSI-RS resource #1 and CSI-RS resource #2 are each 10 ms (milliseconds). A measurement result reporting periodicity is 10 ms. A periodicity of CSI-RS resource #11 is 5 ms. The terminal device measures a signal strength once on a resource corresponding to CSI-RS resource #1, and measures a signal strength once on a resource corresponding to CSI-RS resource #2. The terminal device measures a signal strength twice in total on a resource corresponding to CSI-RS resource #11 in one measurement result reporting periodicity.

The transmit parameter of CSI-RS resource #1 is beam a1, the transmit parameter of CSI-RS resource #2 is beam a2, and a transmit parameter of CSI-RS resource #11 is beam a3. A receive parameter of CSI-RS resource #1 is beam b1. The terminal device measures, by using beam b1, a signal strength of CSI-RS 1 on the resource corresponding to CSI-RS resource #1, to obtain first signal strength P1. The terminal device measures, by using beam b2, a signal strength of CSI-RS 2 on the resource corresponding to CSI-RS resource #2, to obtain first signal strength P2. The network device sends CSI-RS 11 twice on CSI-RS resource #11 within 10 ms by using beam a3. The terminal device measures, by using beam b1, a signal strength of CSI-RS 11 sent for the first time, to obtain second signal strength P11. The terminal device measures, by using beam b2, a signal strength of CSI-RS 11 sent for the second time, to obtain second signal strength P12. If the periodicity of the second resource is the same as the periodicity of the first resource, to measure the signal strength of CSI-RS 11 twice takes 20 ms. The measurement result reporting periodicity changes to 20 ms. Therefore, the periodicity of the second resource is set to 1/N of the periodicity of the first resource, so that duration of a measurement result reporting periodicity is reduced, and a beam training speed is increased.

In a possible implementation, a periodicity of the second resource is the same as a periodicity of the first resource, and a time domain range for measuring the N second signal strengths is less than or equal to a time length of one time unit. That is, total duration for measuring the N second signal strengths is less than or equal to a time length of one time unit. Optionally, one time unit is one orthogonal frequency division multiplexing (OFDM) symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like. With this possible implementation implemented, duration of a measurement result reporting periodicity is reduced, and a beam training speed is increased.

For example, in FIG. 9, periodicities of CSI-RS resource #1 and CSI-RS resource #2 are each 10 ms (millisecond). A measurement result reporting periodicity is 10 ms. A periodicity of CSI-RS resource #11 is 10 ms. The terminal device measures, by using beam b1, a signal strength of CSI-RS 1 on a resource corresponding to CSI-RS resource #1, to obtain first signal strength P1. The terminal device measures, by using beam b2, a signal strength of CSI-RS 2 on a resource corresponding to CSI-RS resource #2, to obtain first signal strength P2. The network device sends, by using beam a3 within 10 ms, CSI-RS 11 once on a resource corresponding to CSI-RS resource #11. Duration in which the network device sends CSI-RS 11 once is equal to one OFDM symbol. In one OFDM symbol, the terminal device measures a signal strength of CSI-RS 11 twice in total. During the first measurement, the terminal device measures the signal strength of CSI-RS 11 by using beam b1, to obtain second signal strength P11. During the second measurement, the terminal device measures the signal strength of CSI-RS 11 by using beam b2, to obtain second signal strength P12.

In a possible implementation, a time domain range for measuring the second signal strength each time is less than or equal to $N_{IFFT}/N - N_{CP}/N$, $N_{CP}$ is a time length of a cyclic prefix, and $N_{IFFT}$ is a time length of one time unit.

In a possible implementation, the measurement of the N second signal strengths is performed after the cyclic prefix.

706. The terminal device reports one or more first SINRs to the network device.

In this embodiment of this application, the first SINR is an SINR in N SINRs that are obtained based on the N first signal strengths and the N second signal strengths.

For example, the terminal device measures first signal strength P1, first signal strength P2, second signal strength P11, and second signal strength P12. The terminal device determines two SINRs. SINR 1=P1/(P11+N1). SINR 2=P2/(P12+N2). N1 and N2 are noise power. N1 and N2 is the same or different. The terminal device reports SINR 1 and SINR 2 to the network device. Alternatively, the terminal device reports a maximum value or a minimum value of SINR 1 and SINR 2 to the network device.

In a possible implementation, the terminal device reports a first SINR to the network device, and the first SINR is obtained based on a sum of the N first signal strengths and a sum of the N second signal strengths. For example, the first SINR=(P1+P2)/(P11+P12+N1). With a possible implementation, an interference accumulation function is implemented. When an interference environment experienced by the terminal device is complex, the interference measurement is more accurate.

In a possible implementation, if the terminal device measures the first signal strength once within a time length of one time unit, and measures the second signal strength for N times within a time length of one time unit, scaling of the measured signal strength needs to be considered during SINR calculation. In other words, the terminal device determines the SINR based on the first signal strength, the second signal strength, and a scaling factor. The scaling factor is related to N. For example, the scaling factor is equal to N or is an integer multiple of N. For example, the terminal device measures first signal strength P1, first signal strength P2, second signal strength P11, and second signal strength P12. SINR 1=P1/(2*P11+N1), and SINR 2=P2/(2*P12+N2). Alternatively, SINR 1=0.5*P1/(P11+N1), and SINR 2=0.5*P2/(P12+N2).

Optionally, a CSI processing unit (CPU) that needs to be occupied by the terminal device to measure the first signal strength once in one time unit is 1. If the terminal device needs to measure the second signal strength for N times in a time length of one time unit, a CSI calculation unit (CPU) that needs to be occupied by the terminal device to process the second resource is W, where W is a number greater than 1 and less than or equal to N.

In a possible implementation, when the receive parameters of the N first resources are the same, the signal strength on the second resource is measured once, to obtain one second signal strength. The first SINR reported to the network device is an SINR in the N SINRs that are obtained based on the N first signal strengths and one second signal strength.

For example, receive parameters of CSI-RS resource #1 and CSI-RS resource #2 in FIG. 8 are the same, and both are beam b1. The terminal device measures, by using beam b1, a signal strength of CSI-RS 1 on a resource corresponding to CSI-RS resource #1, to obtain first signal strength P1. The terminal device measures, by using beam b1, a signal strength of CSI-RS 2 on a resource corresponding to CSI-RS resource #2, to obtain first signal strength P2. The terminal device measures, by using beam b1, a signal strength of CSI-RS 11 on a resource corresponding to CSI-RS resource #11, to obtain second signal strength P11. The terminal device obtains SINR 1=P1/(P11+N1) and SINR 2=P2/(P11+N2). The terminal device reports one or more of SINR 1 and SINR 2 to the network device.

In a possible implementation, the terminal device measures the signal strength on the second resource for Z times, to obtain Z second signal strengths. Z is a quantity of different receive parameters in the first resource set.

In a possible implementation, a periodicity of the second resource is 1/Z of a periodicity of the first resource. Z is a quantity of different receive parameters in the first resource set.

In a possible implementation, the terminal device reports capability information, and the capability information indicates whether the terminal device supports the method described in the embodiment corresponding to FIG. 7.

In a possible implementation, the terminal device performs the method described in the embodiment corresponding to FIG. 7, as predefined in a protocol or as indicated by the network device.

In the method described in FIG. 7, the network device configures, in the first resource set, the identifiers of the N first resources, and configures, in the second resource set, the same identifiers of the N first resources. The identifiers of the N first resources are in a one-to-one correspondence with the identifiers of the N second resources. Therefore, with the method described in FIG. 7 implemented, resource overheads are reduced.

Figure 18:
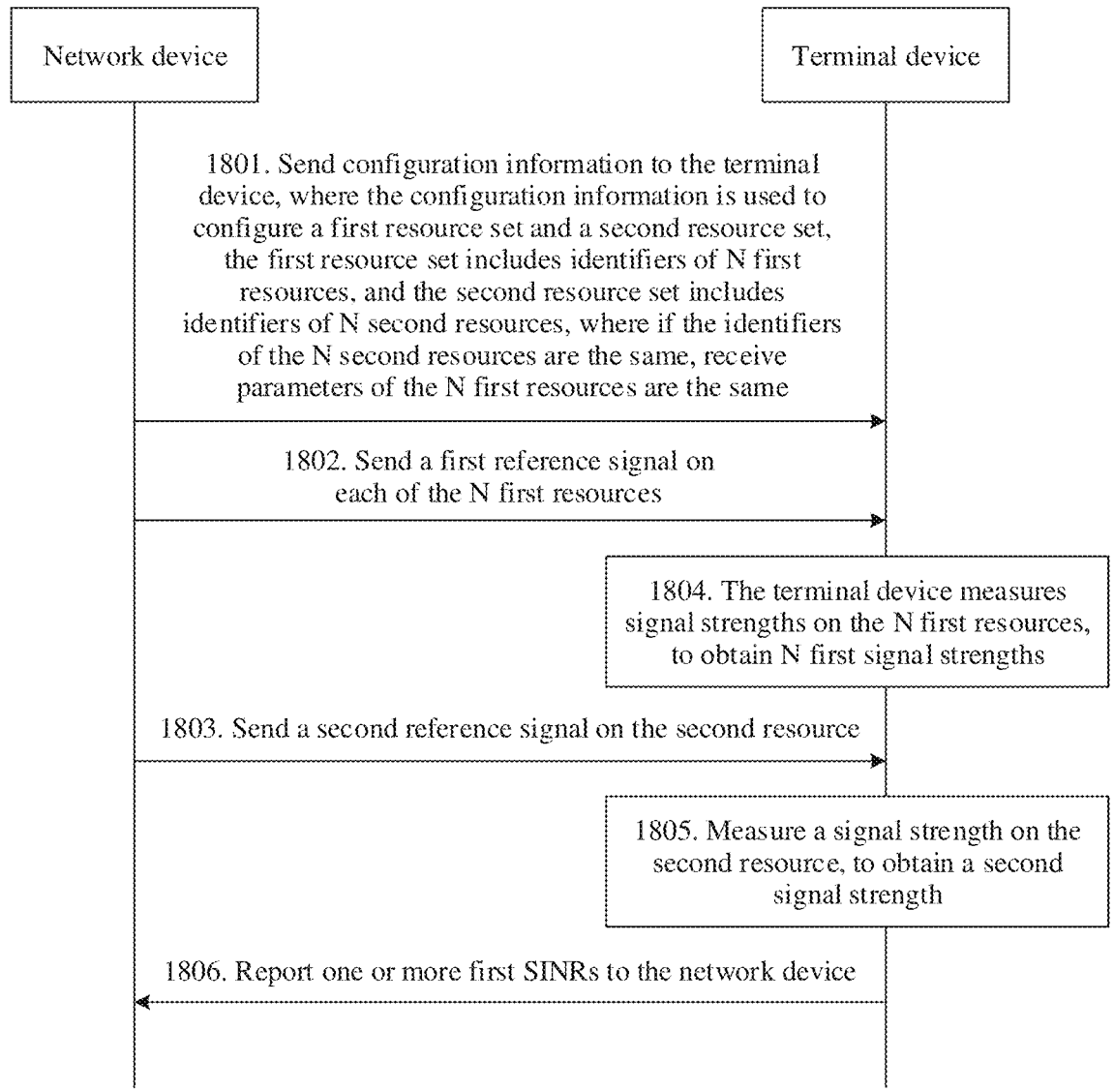
FIG. 18 is a schematic flowchart of another information reporting method according to an embodiment of this application.

With reference to FIG. 18, the following describes how to reduce overheads of IMR resources.

FIG. 18 is a schematic flowchart of another information reporting method according to an embodiment of this application. As shown in FIG. 18, the information reporting method includes the following step 1801 to step 1806.

1801: A network device sends configuration information to a terminal device.

The configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the identifiers of the N second resources are the same, receive parameters of the N first resources are the same.

For example, the first resource set and the second resource set configured by using the configuration information is shown in FIG. 8. For a description of the configuration information, refer to the description of step 701. Details are not described herein again.

In a possible implementation, the receive parameter in this application is a QCL TypeD parameter, a QCL TypeA parameter, or the like.

In a possible implementation, the first resource set is a non-zero power CSI-RS resource set used for channel measurement. The second resource set is a non-zero power CSI-RS resource set used for interference measurement.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

In a possible implementation, if the identifiers of the N second resources are the same, the configuration information is further used to indicate that the receive parameters of the N first resources are the same. Based on this possible implementation, the network device indicates to the terminal device that the receive parameters of the N first resources are the same. Alternatively, the terminal device determines, based on whether the identifiers of the N second resources are the same, whether the receive parameters of the N first resources are the same.

1802. The network device sends a first reference signal on each of the N first resources.

1803. The network device sends a second reference signal on the second resource.

1804. The terminal device measures signal strengths on the N first resources, to obtain N first signal strengths.

1805. The terminal device measures a signal strength on the second resource, to obtain a second signal strength.

In a possible implementation, a implementation of measuring, by the terminal device, a signal strength on the second resource, to obtain a second signal strength is: measuring the signal strength on the second resource once, to obtain one second signal strength, where a receive parameter of the second resource is the same as the receive parameters of the N first resources. Alternatively, that a receive parameter of the second resource is the same as the receive parameters of the N first resources are expressed as: The receive parameter of the second resource is QCLed with the receive parameters of the N first resources.

Based on this possible implementation, the terminal device measures a plurality of first resources and one second resource by using a same receive parameter, so that measurement load of the terminal device is reduced, and communication overheads of the network device is reduced.

Alternatively, the signal strength on the second resource is measured for N times by using the receive parameters of the N first resources, to obtain N second signal strengths. This is not limited in this embodiment of this application.

1806. The terminal device reports one or more first SINRs to the network device.

In this embodiment of this application, the first SINR is an SINR obtained based on the second signal strength and the N first signal strengths.

For example, the terminal device measures the signal strength on the second resource once. CSI-RS resource #1 and CSI-RS resource #2 in FIG. 8 have a same receive parameter, and are both beam b1. The terminal device measures, by using beam b1, a signal strength of CSI-RS 1 on a resource corresponding to CSI-RS resource #1, to obtain first signal strength P1. The terminal device measures, by using beam b1, a signal strength of CSI-RS 2 on a resource corresponding to CSI-RS resource #2, to obtain first signal strength P2. The terminal device measures, by using beam b1, a signal strength of CSI-RS 11 on a resource corresponding to CSI-RS resource #11, to obtain second signal strength P11. The terminal device obtains SINR 1=P1/(P11+N1) and SINR 2=P2/(P11+N2). The terminal device reports one or more of SINR 1 and SINR 2 to the network device.

In the method described in FIG. 18, that the identifiers that are of the N second resources and that are included in the second resource set are the same is understood as: The second resource set actually includes one second resource. Therefore, based on the method described in FIG. 18, overheads of interference measurement resources are reduced.

In a possible implementation, the configuration information is further used to configure receive parameters of one or more of the N first resources. Based on this possible implementation, the terminal device performs signal measurement on the N first resources and the second resource by using a same receive parameter (that is, the configured receive parameters of the one or more of the N first resources).

For example, the first resource set and the second resource set shown in FIG. 8 are used as an example. The network device does not configure a receive parameter of CSI-RS resource #1, and configures a receive parameter of CSI-RS resource #2. The terminal device measures signal strengths on CSI-RS resource #1, CSI-RS resource #2, and CSI-RS resource #10 by using a same receive parameter (that is, the receive parameter of CSI-RS resource #2).

For another example, the first resource set and the second resource set shown in FIG. 8 are used as an example. The network device does not configure a receive parameter of CSI-RS resource #2, and configures a receive parameter of CSI-RS resource #1. The terminal device measures signal strengths on CSI-RS resource #1, CSI-RS resource #2, and CSI-RS resource #10 by using a same receive parameter (that is, the receive parameter of CSI-RS resource #1).

In a possible implementation, the configuration information is further used to configure the receive parameters of the N first resources. Based on this possible implementation, the terminal device performs signal measurement on the N first resources and the second resource by using a same receive parameter (that is, the configured receive parameters of the N first resources).

For example, the first resource set and the second resource set shown in FIG. 8 are used as an example. The network device configures a receive parameter of CSI-RS resource #2 and a receive parameter of CSI-RS resource #1, and ensures that the receive parameter of CSI-RS resource #2 is the same as the receive parameter of CSI-RS resource #1. The terminal device measures signal strengths on CSI-RS resource #1, CSI-RS resource #2, and CSI-RS resource #10 by using a same receive parameter (that is, the receive parameters of CSI-RS resource #1 and CSI-RS resource #2).

In a possible implementation, the configuration information is further used to configure the receive parameter of the second resource. Based on this possible implementation, the terminal device performs signal measurement on the N first resources and the second resource by using a same receive parameter (that is, the configured receive parameter of the second resource).

For example, the first resource set and the second resource set shown in FIG. 8 are used as an example. The network device configures a receive parameter of CSI-RS resource #10. The terminal device measures signal strengths on CSI-RS resource #1, CSI-RS resource #2, and CSI-RS resource #10 by using a same receive parameter (that is, the receive parameter of CSI-RS resource #10).

In a possible implementation, the network device does not configure the receive parameters of the first resource and the second resource, and the terminal device performs signal measurement on the N first resources and the second resource by using a same receive parameter.

For example, the network device does not configure receive parameters of CSI-RS resource #1, CSI-RS resource #2, and CSI-RS resource #10, and the terminal device measures signal strengths on CSI-RS resource #1, CSI-RS resource #2, and CSI-RS resource #10 by using a same receive parameter.

Figure 19:
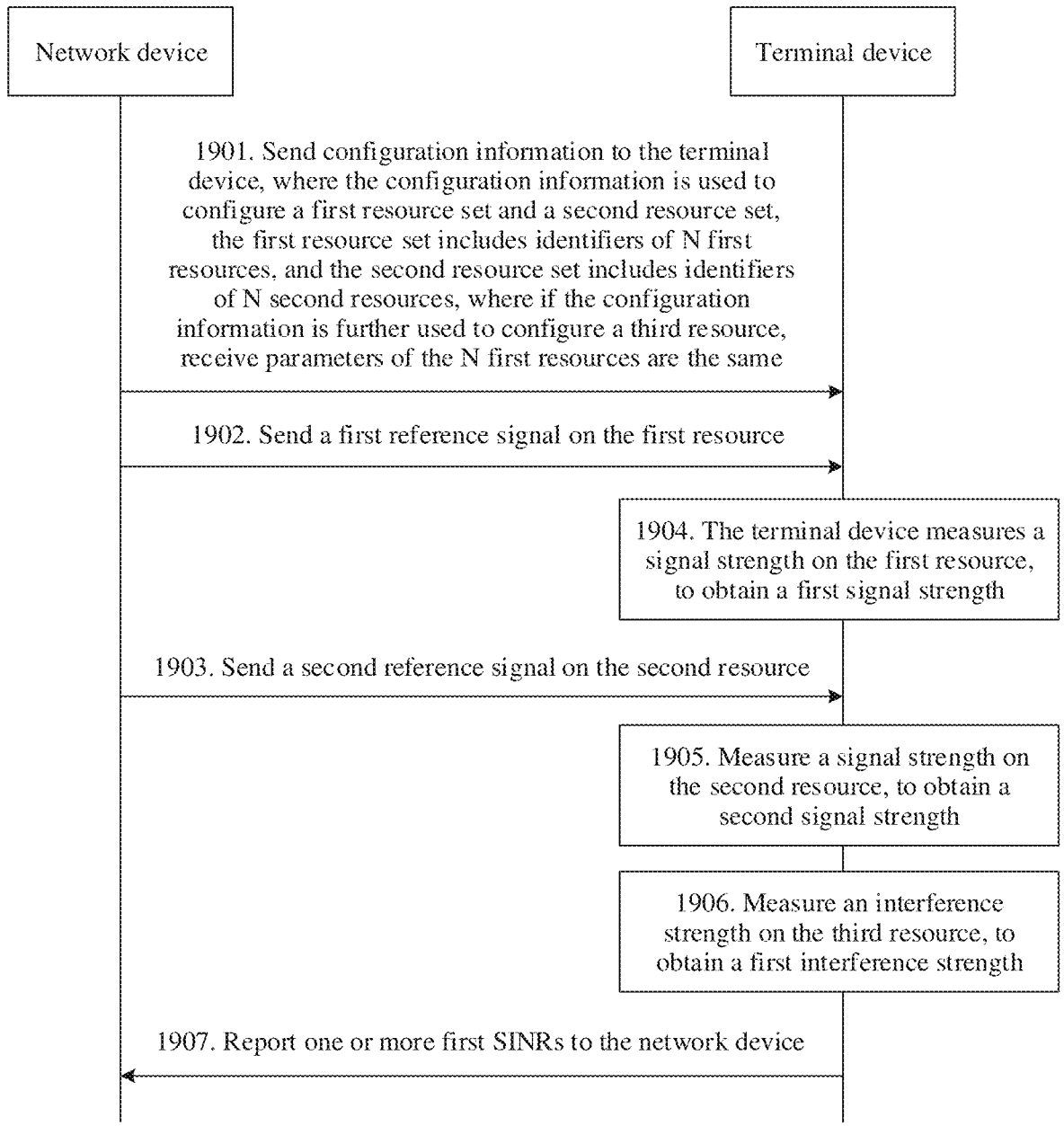
FIG. 19 is a schematic flowchart of another information reporting method according to an embodiment of this application.

FIG. 19 is a schematic flowchart of another information reporting method according to an embodiment of this application. As shown in FIG. 19, the information reporting method includes the following step 1901 to step 1907.

1901. A network device sends configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the configuration information is further used to configure a third resource, the third resource is associated with the first resource set, and the third resource is a zero power reference signal resource used for interference measurement, receive parameters of the N first resources are the same.

The first resource set is a non-zero power CSI-RS resource set used for channel measurement. The second resource set is a non-zero power CSI-RS resource set used for interference measurement. The third resource is a zero power CSI-RS resource used for interference measurement. For L1-SINR measurement, in an existing protocol that a non-zero power CSI-RS resource set used for channel measurement further corresponds to a zero power CSI-RS resource used for interference measurement. The original text of the standard is as follows: When three Resource Settings are configured, the first one Resource Setting (given by higher layer parameterresourcesForChannelMeasurement) is for channel measurement on SSB or NZP CSI-RS. The second one (given by either higher layer parameter csi-IM-ResourcesForInterference) is for interference measurement performed on CSI-IM, where each NZP CSI-RS resource set for channel measurement is associated with one CSI-IM resource for interference measurement. The Third one (given by higher layer parameter nzp-CSI-RS-ResourcesForInterference) is for interference measurement performed on 1 port NZP CSI-RS with density 3 REs/RBs (that is, if three resource settings are configured, a first resource setting (configured by a channel measurement resource parameter (parameterresourcesForChannelMeasurement)) is used for channel measurement performed based on an SSB-based CSI-RS or a non-zero power CSI-RS). A second resource setting (configured by an interference measurement CSI-IM resource parameter (csi-IM-ResourcesForInterference)) is used for interference measurement performed by using CSI-IM. Each non-zero power CSI-RS resource set used for channel measurement is associated with a CSI-IM resource used for interference measurement. A third resource setting (configured by an interference measurement non-zero power CSI-RS resource parameter) is used for interference measurement performed based on a non-zero NZP CSI-RS with a single-port density of 3 REs/RBs.

In a possible implementation, that receive parameters of the N first resources are the same is further expressed as: The receive parameters of the N first resources are quasi-co-located (QCLed). Alternatively, the first resource set is a non-zero power CSI-RS resource set used for channel measurement, and that receive parameters of the N first resources are the same is further expressed as: non-zero power CSI-RS resources in each non-zero power CSI-RS resource set used for channel measurement are QCLed with respect to 'QCL-TypeD' parameters.

In a possible implementation, if the configuration information is further used to configure the third resource, the configuration information is further used to indicate that the receive parameters of the N first resources are the same. Based on this possible implementation, the network device indicates to the terminal device that the receive parameters of the N first resources are the same. Alternatively, the terminal device determines, based on whether the third resource is configured based on the configuration information, whether the receive parameters of the N first resources are the same.

1902. The network device sends a first reference signal on the first resource.

In this embodiment of this application, after sending the configuration information, the network device sends the first reference signal on the first resource.

1903. The network device sends a second reference signal on the second resource.

In this embodiment of this application, after sending the configuration information, the network device sends the second reference signal on the first resource.

1904. The terminal device measures a signal strength on the first resource, to obtain a first signal strength.

In this embodiment of this application, after receiving the configuration information, the terminal device measures the signal strength on the first resource, to obtain the first signal strength.

1905. The terminal device measures a signal strength on the second resource, to obtain a second signal strength.

In this embodiment of this application, after receiving the configuration information, the terminal device measures the signal strength on the second resource, to obtain the second signal strength.

1906. The terminal device measures an interference strength on the third resource, to obtain a first interference strength.

In this embodiment of this application, after receiving the configuration information, the terminal device measures the interference strength on the third resource, to obtain the first interference strength.

1907. The terminal device reports one or more first signal to interference plus noise ratios (SINRs) to the network device, where the first SINR is an SINR obtained based on the first signal strength, the second signal strength, and the first interference strength.

For example, the first signal strength is P1, the second signal strength is P11, and the first interference strength is P12. The terminal device obtains SINR 1=P1/(P11+P12+N1). The terminal device reports SINR 1 to the network device.

For another example, there is more than one first signal strength: P1 and P2. The second signal strength is P11, and the first interference strength is P12. The terminal device obtains SINR 1=P1/(P11+P12+N1), and SINR 2=P2/(P11+P12+N1). The terminal device reports SINR 1 and/or SINR 2 to the network device.

In the method described in FIG. 19, the third resource is used to measure interference by using the receive parameter of the first resource. Because there is one third resource, when the receive parameters of the N first resources are the same, the terminal device successfully measures interference on the zero power-reference signal resource by using the receive parameter of the first resource.

In a possible implementation, the identifiers that are of the N first resources and that are in the first resource set is the same or different. In other words, the N first resources are a same resource or different resources.

In a possible implementation, the identifiers that are of the N second resources and that are in the second resource set is the same or different. In other words, the N second resources are a same resource or different resources.

In a possible implementation, receive parameters of the N second resources, the receive parameters of the N first resources, and a receive parameter of the third resource are the same. Alternatively, expressed as: Receive parameters of the N second resources, the receive parameters of the N first resources, and a receive parameter of the third resource are quasi-co-located (QCLed). Alternatively, if the identifiers that are of the N first resources and that are in the first resource set are the same (that is, the N first resources are one resource), further expressed as: Receive parameters of the N second resources, the receive parameter of the first resource, and a receive parameter of the third resource are the same. Alternatively, if the identifiers that are of the N second resources and that are in the second resource set are the same (that is, the N second resources are one resource), further expressed as: Receive parameter of the second resource, the receive parameters of the N first resources, and a receive parameter of the third resource are the same.

With this possible implementation implemented, interference caused by a transmit parameter of the second resource to a transmit parameter and/or the receive parameter of the first resource is accurately measured.

In a possible implementation, the configuration information is further used to configure receive parameters of one or more of the N first resources. Based on this possible implementation, the terminal device performs signal measurement on the first resource and the second resource by using a same receive parameter (that is, the configured receive parameters of the one or more of the N first resources), and perform interference measurement on the third resource.

In a possible implementation, the configuration information is further used to configure the receive parameters of the N first resources. Based on this possible implementation, the terminal device performs signal measurement on the first resource and the second resource by using a same receive parameter (that is, the configured receive parameters of the N first resources), and perform interference measurement on the third resource. If the identifiers that are of the N first resources and that are in the first resource set are the same, further expressed as: The configuration information is further used to configure the receive parameter of the first resource.

In a possible implementation, the configuration information is further used to configure receive parameters of one or more of the second resource. Based on this possible implementation, the terminal device performs signal measurement on the first resource and the second resource by using a same receive parameter (that is, the configured receive parameters of the one or more of the second resource), and perform interference measurement on the third resource.

In a possible implementation, the configuration information is further used to configure the receive parameters of the N second resources. Based on this possible implementation, the terminal device performs signal measurement on the first resource and the second resource by using a same receive parameter (that is, the configured receive parameters of the N second resources), and perform interference measurement on the third resource. If the identifiers that are of the N second resources and that are in the second resource set are the same, further expressed as: The configuration information is further used to configure the receive parameter of the second resource.

In a possible implementation, the configuration information is further used to configure the receive parameter of the third resource. Based on this possible implementation, the terminal device performs signal measurement on the first resource and the second resource by using a same receive parameter (that is, the configured receive parameter of the third resource), and perform interference measurement on the third resource.

In a possible implementation, the identifiers that are of the N second resources and that are in the second resource set are the same, the receive parameter of the second resource is the same as the receive parameters of the N first resources, and a implementation of measuring a signal strength on the second resource, to obtain a second signal strength is: measuring the signal strength on the second resource once, to obtain one second signal strength. Based on this possible implementation, the terminal measures a plurality of first resources and one second resource by using a same receive parameter, so that measurement load of the terminal device is reduced, and communication overheads of the network device is reduced.

In a possible implementation, the configuration information is further used to configure the receive parameter of the third resource. Based on this possible implementation, the terminal measures a plurality of first resources and one second resource by using a same receive parameter, so that measurement load of the terminal device is reduced, and communication overheads of the network device is reduced.

In a possible implementation, the receive parameters of the N first resources are different, and a periodicity of the third resource is 1/N of a periodicity of the first resource. The third resource is used to measure interference by using the receive parameter of the first resource. Because there is one third resource, when the periodicity of the third resource is 1/N of the periodicity of the first resource, the terminal device successfully measures interference on the zero power reference signal resource by using the receive parameter of the first resource.

In a possible implementation, the receive parameters of the N first resources are different, a periodicity of the third resource is the same as a periodicity of the first resource, and a time domain range for measuring interference strengths of the N third resources is less than or equal to a time length of one time unit. The third resource is used to measure interference by using the receive parameter of the first resource. Because there is one third resource, when the periodicity of the third resource is the same as the periodicity of the first resource, the time domain range for measuring the interference strengths of the N third resources is less than or equal to a time length of one time unit, so that the terminal device successfully measures the interference on the zero power reference signal resource by using the receive parameter of the first resource.

In a possible implementation, the methods described in FIG. 4, FIG. 7, FIG. 10, and FIG. 18 is combined with the method described in FIG. 19.

Figures 10, 11:
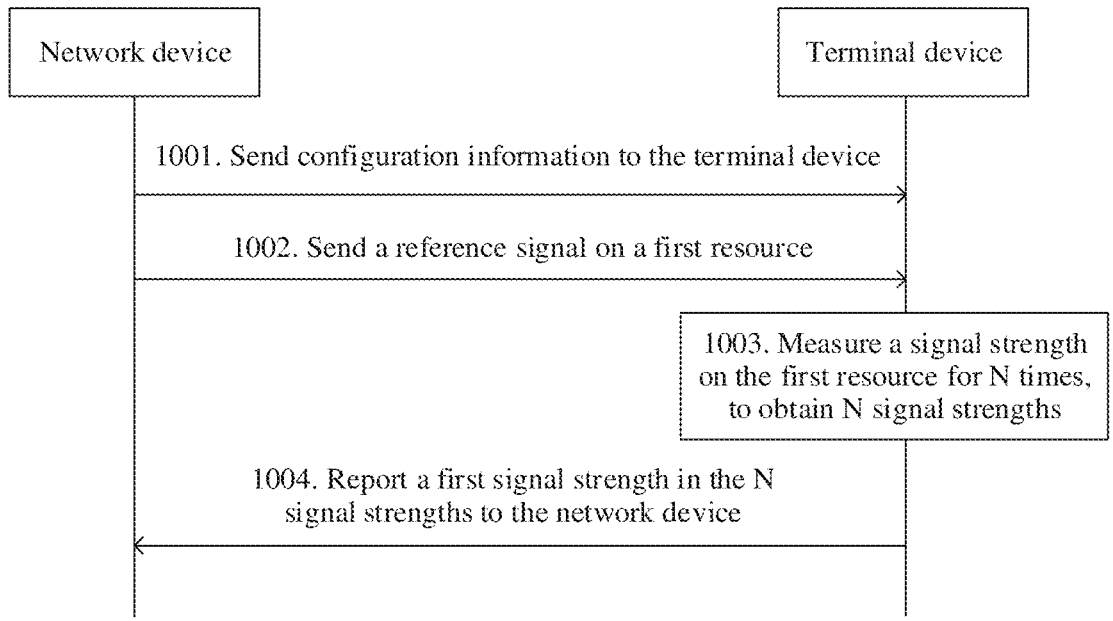
FIG. 10 is a schematic flowchart of another information reporting method according to an embodiment of this application.
FIG. 11 is a schematic diagram of still another related configuration of measurement and reporting of a reference signal used for beam training according to an embodiment of this application.

With reference to FIG. 10, the following describes another method for reducing overheads of CMR resources.

FIG. 10 is a schematic flowchart of an information reporting method according to an embodiment of this application. As shown in FIG. 10, the information reporting method includes the following step 1001 to step 1004. The method shown in FIG. 10 is performed by a network device and a terminal device, or is performed by a chip in the network device and a chip in the terminal device. In FIG. 10, an example in which the method is performed by the network device and the terminal device is used for description. Execution bodies of information reporting methods shown in other accompanying drawings in embodiments of this application are similar to what are described herein. Details are not described below again.

1001. The network device sends configuration information to the terminal device.

The configuration information is used to configure a first resource set, resources corresponding to resource identifiers in the first resource set are used for channel measurement, the first resource set includes identifiers of N first resources, the identifiers of the N first resources are the same, and N is an integer greater than 1. The first resource set includes the identifiers of the N first resources, and the identifiers of the N first resources are the same. Therefore, the first resource set includes N same first resources, or the first resource set includes one first resource.

For example, as shown in FIG. 11, the first resource set is a resource set corresponding to resource set #1 (resourceset #1). The first resource set includes two same identifiers of first resources, and the identifiers of the first resource are CSI-RS resource #1.

Optionally, the configuration information further includes a repetition factor. When the repetition factor is on, indicating that transmit parameters of the N first resources are a same transmit parameter. When the repetition factor is off, indicating that transmit parameters of the N first resources are not a same transmit parameter. For example, as shown in FIG. 11, the repetition factor is repetition. "Repetition: ON" indicates that the repetition factor is on. "Repetition: OFF" indicates that the repetition factor is off. In FIG. 11, for example, the repetition factor is on.

1002. The network device sends a reference signal on the first resource.

In this embodiment of this application, after the network device sends the configuration information to the terminal device, the network device sends the reference signal on the first resource.

1003. The terminal device measures the signal strength on the first resource for N times, to obtain N signal strengths.

In this embodiment of this application, after receiving the configuration information, the terminal device measures the signal strength on the first resource for N times, to obtain the N signal strengths.

There are two implementations of measuring, by the terminal device, the signal strength on the first resource for N times, which are as follows:

Manner 1: If the network device sends a reference signal on the first resource once or for N times by using one transmit parameter, the terminal device measures the signal strength on the first resource for N times by using N different receive parameters.

Figure 12:
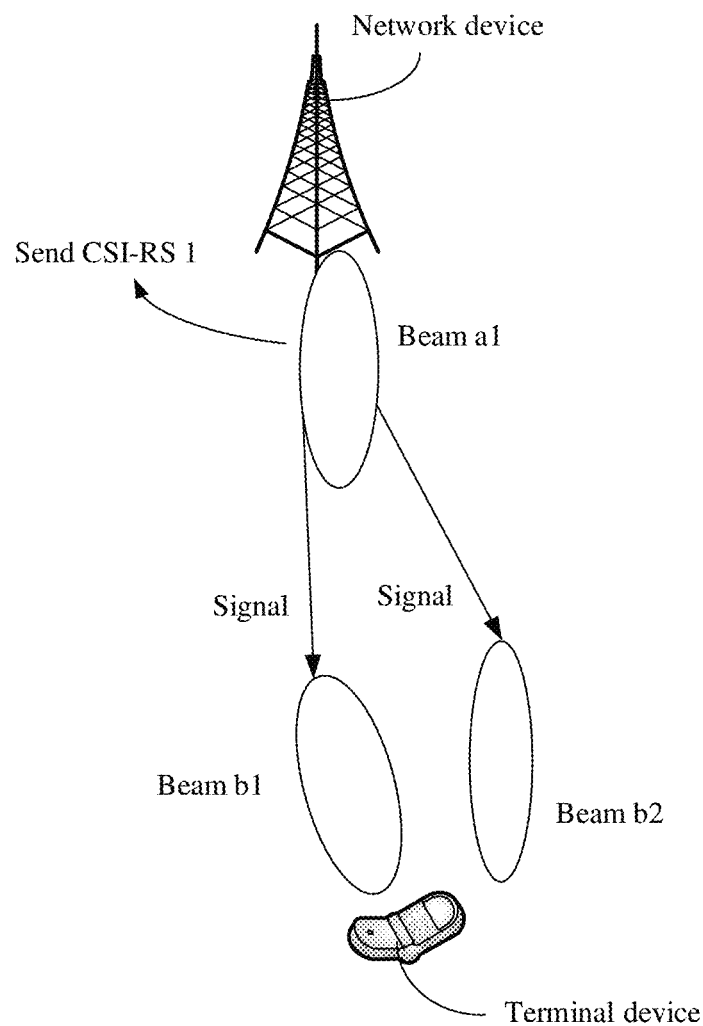
FIG. 12 is a schematic diagram of a channel measurement method according to an embodiment of this application.

For example, as shown in FIG. 11 and FIG. 12, the repetition factor in the configuration information is on. Transmit parameters of two CSI-RS resources #1 are both transmit beam a1. The network device sends CSI-RS 1 once or twice in one measurement result reporting periodicity by using beam a1. CSI-RS resource #1 ranking first corresponds to receive beam b1, and CSI-RS resource #1 ranking second corresponds to receive beam b2. The terminal device measures, for the first time by using receive beam b1, CSI-RS 1 on a resource corresponding to CSI-RS resource #1, to obtain signal strength P1. The terminal device measures, for the second time by using receive beam b2, CSI-RS 1 on a resource corresponding to CSI-RS resource #1, to obtain signal strength P2.

In a possible implementation, a time domain range for performing the N times of measurement by the terminal device is less than or equal to a time length of one time unit. In other words, total duration in which the terminal device performs the N times of measurement is less than or equal to a time length of one time unit. Optionally, one time unit is one OFDM symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like. With this possible implementation implemented, duration of a measurement result reporting periodicity is reduced, and a beam training speed is increased.

For example, as shown in FIG. 12, the network device sends CSI-RS 1 once in a measurement result reporting periodicity. Duration in which the network device sends CSI-RS 1 once is equal to one OFDM. In one OFDM, the terminal device measures the signal strength of CSI-RS 1 twice in total. During the first measurement, the terminal device measures the signal strength of CSI-RS 1 by using beam b1, to obtain signal strength P1. During the second measurement, the terminal device measures the signal strength of CSI-RS 1 by using beam b2, to obtain signal strength P2.

In a possible implementation, a time domain measurement range for each of the N times of measurement is less than or equal to $N_{IFFT}/N$, and $N_{IFFT}$ is a time length of one time unit.

In a possible implementation, a time domain measurement range for each of the N times of measurement is less than or equal to $N_{IFFT}/N-N_{CP}/N$, $N_{CP}$ is a time length of a cyclic prefix, and $N_{IFFT}$ is a time length of one time unit. The cyclic prefix is a guard interval, and is unable to be used to send a reference signal. Therefore, the time domain measurement range for each of the N times of measurement is less than or equal to $N_{IFFT}/N-N_{CP}/N$.

Figure 13:
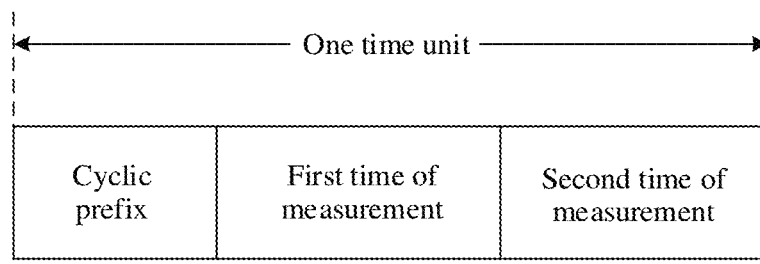
FIG. 13 is a schematic diagram of a time unit according to an embodiment of this application.
Figure 14:
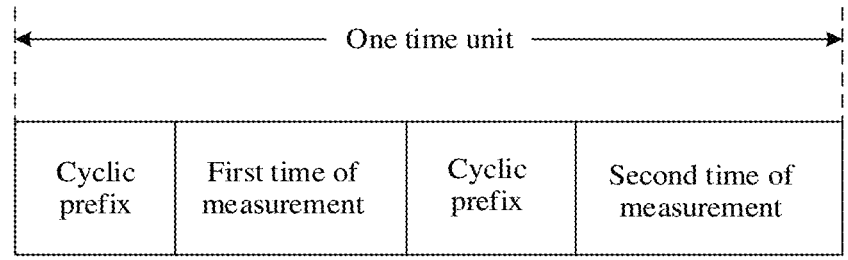
FIG. 14 is a schematic diagram of a time unit according to an embodiment of this application.

In a possible implementation, the N times of measurement are performed after the cyclic prefix. For example, as shown in FIG. 13, there is one cyclic prefix in a time unit, and the N times of measurement are performed after the cyclic prefix. For another example, as shown in FIG. 14, there is a plurality of cyclic prefixes in one time unit, and each of the N times of measurement is performed after one cyclic prefix.

Manner 2: The network device sends a reference signal on the first resource for N times by using N different transmit parameters. The terminal device measures the signal strength on the first resource for N times by using a same receive parameter.

Figure 15:
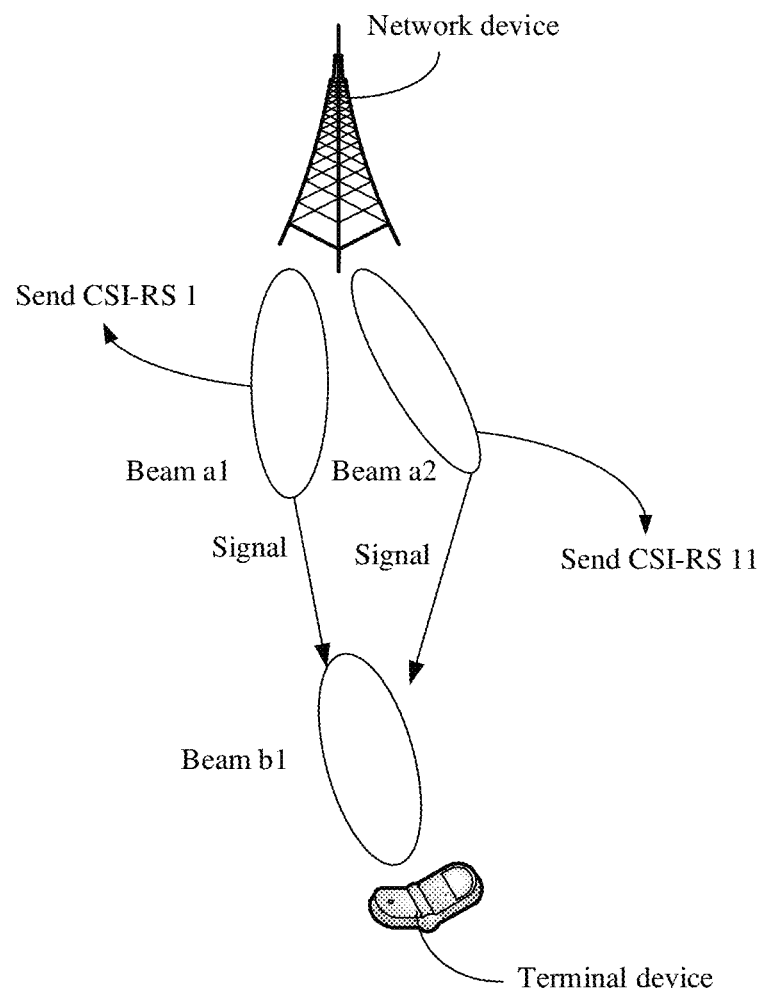
FIG. 15 is a schematic diagram of another channel measurement method according to an embodiment of this application.

For example, the repetition factor in the configuration information is assumed off. As shown in FIG. 15, CSI-RS resource #1 ranking first corresponds to transmit beam a1, and CSI-RS resource #1 ranking second corresponds to transmit beam a2. Receive parameters of two CSI-RS resources #1 are both receive beam b1. The terminal device measures, for the first time by using receive beam b1, CSI-RS 1 sent by using beam a1, to obtain signal strength P1. The terminal device measures, for the second time by using receive beam b1, CSI-RS 1 sent by using beam a2, to obtain signal strength P2.

In a possible implementation, a time domain range for sending, by the network device, a reference signal for N times by using the N transmit parameters is less than or equal to a time length of one time unit. In other words, total duration in which the network device sends a reference signal for N times by using the N transmit parameters is less than or equal to a time length of one time unit. Correspondingly, a time domain range for performing the N times of measurement by the terminal device is less than or equal to a time length of one time unit. In other words, total duration in which the terminal device performs the N times of measurement is less than or equal to a time length of one time unit. Optionally, one time unit is one OFDM symbol. Alternatively, one time unit is two OFDM symbols, three OFDM symbols, four OFDM symbols, or the like. With this possible implementation implemented, duration of a measurement result reporting periodicity is reduced, and a beam training speed is increased.

For another example, as shown in FIG. 15, in one OFDM, the network device sends CSI-RS 1 twice in total. During first sending, the network device sends CSI-RS 1 by using beam a1. During second sending, the network device sends CSI-RS 1 by using beam a2. In one OFDM, the terminal device measures a signal strength of CSI-RS 1 twice in total. During the first measurement, the terminal device measures, by using beam b1, the signal strength of CSI-RS 1 sent by using beam a1, to obtain signal strength P1. During the second measurement, the terminal device measures, by using beam b2, the signal strength of CSI-RS 1, to obtain signal strength P2.

In a possible implementation, a time domain range of sending, by the network device, a reference signal each time by using the N transmit parameters is less than or equal to $N_{IFFT}/N$, and $N_{IFFT}$ is a time length of one time unit. Correspondingly, in the N times of measurement performed by the terminal device, a time domain measurement range for each time of measurement is less than or equal to $N_{IFFT}/N$.

In a possible implementation, a time domain range of sending, by the network device, a reference signal each time by using the N transmit parameters is less than or equal to $N_{IFFT}/N-N_{CP}/N$, $N_{CP}$ is a time length of a cyclic prefix, and $N_{IFFT}$ is a time length of one time unit. Correspondingly, in the N times of measurement performed by the terminal device, a time domain measurement range for each time of measurement is less than or equal to $N_{IFFT}/N-N_{CP}/N$.

In a possible implementation, the network device sends a reference signal for N times by using the N transmit parameters after the cyclic prefix. Correspondingly, the N times of measurement performed by the terminal device are performed after the cyclic prefix.

In a possible implementation, a method for performing, by the terminal device, measurement for N times in a time length less than or equal to one time unit is predefined in a protocol or is further indicated by the network device. The method includes any one of the following methods: an interleaved frequency division multiple access (IFDMA)-based signal sending and/or receiving method, a large subcarrier spacing-based signal sending and/or receiving method, and a discrete Fourier transform (DFT)-based signal sending and/or receiving method.

1004. The terminal device reports a first signal strength in the N signal strengths to the network device.

In this embodiment of this application, after measuring the N signal strengths, the terminal device reports the first signal strength in the N signal strengths to the network device. The first signal strength is a minimum value or a maximum value.

In a possible implementation, when the repetition factor in the configuration information is off, the terminal device further reports, to the network device, a position of an identifier of a first resource in the first resource set, where the first resource corresponds to the first signal strength, so that the network device determines a transmit parameter used to measure the first signal strength.

In a possible implementation, the terminal device reports capability information, and the capability information indicates whether the terminal device supports the method described in the embodiment corresponding to FIG. 10.

In a possible implementation, the terminal device performs the method described in the embodiment corresponding to FIG. 10, as predefined in a protocol or as indicated by the network device.

In existing beam training, different CMR resources are used for training. According to the method described in FIG. 10, beam training is performed by using a same CMR resource, so that overheads of the CMR resource is reduced.

In a possible implementation, this application provides an uplink beam training method. The method includes: A network device sends configuration information, where the configuration information is used to configure a first resource set, resources corresponding to resource identifiers in the first resource set are used for uplink sounding, the first resource set includes identifiers of N first resources, the identifiers of the N first resources are the same, and N is an integer greater than 1. After receiving the configuration information, the terminal device sends a reference signal on the first resource. After sending the configuration information, the network device measures a reference signal on the first resource.

In a possible implementation, that the terminal device sends a reference signal on the first resource includes: sending a reference signal for N times by using N transmit parameters, or sending a reference signal for N times by using one transmit parameter. A time domain range for sending, by the terminal device, a reference signal for N times is less than or equal to a time length of one time unit.

In a possible implementation, that the network device measures a reference signal on the first resource includes: measuring a reference signal for N times by using N receive parameters, or measuring a reference signal for N times by using one receive parameter. Optionally, a time domain range for measuring, by the network device, a reference signal for N times is less than or equal to a time length of one time unit.

Optionally, one time unit is one OFDM symbol. Alternatively, one time unit is two OFDM symbols, three OFDM symbols, four OFDM symbols, or the like. Alternatively, the time unit is one slot, one subframe, one millisecond, or the like. Alternatively, the time unit is two slots, two subframes, two milliseconds, or the like.

Figure 16:
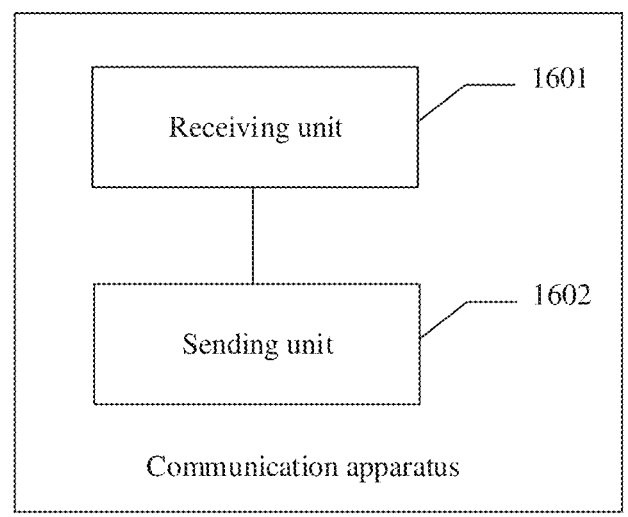
FIG. 16 is a schematic structural diagram of a communication apparatus according to an embodiment of this application.

FIG. 16 is a schematic structural diagram of a communication apparatus according to an embodiment of this application. The communication apparatus shown in FIG. 16 is configured to perform some or all functions of the terminal device in the method embodiment described in FIG. 18. The apparatus is a terminal device, an apparatus in the terminal device, or an apparatus that is used together with the terminal device. The communication apparatus alternatively is a chip system. The communication apparatus shown in FIG. 16 includes a receiving unit 1601 and a sending unit 1602. Optionally, the receiving unit 1601 and the sending unit 1602 alternatively is integrated into one unit, and the unit is referred to as a transceiver unit. This is similar to what are described below. Details are not described below again. Optionally, the communication apparatus further includes a processing unit, configured to process data. In FIG. 16, for example, the communication apparatus includes a receiving unit 1601 and a sending unit 1602. This is similar to what are described below. Details are not described below again.

The receiving unit 1601 is configured to receive configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the identifiers of the N second resources are the same, receive parameters of the N first resources are the same. The receiving unit is 1601 is further configured to measure signal strengths on the N first resources, to obtain N first signal strengths. The receiving unit 1601 is further configured to measure a signal strength on the second resource, to obtain a second signal strength. The sending unit 1602 is configured to report one or more first signal to interference plus noise ratios (SINRs) to the network device, where the first SINR is an SINR obtained based on the N first signal strengths and the second signal strength.

In a possible implementation, if the identifiers of the N second resources are the same, the configuration information is further used to indicate that the receive parameters of the N first resources are the same.

In a possible implementation, a manner in which the receiving unit 1601 measures the signal strength on the second resource, to obtain the second signal strength is specifically: measuring the signal strength on the second resource once, to obtain one second signal strength, where a receive parameter of the second resource is the same as the receive parameters of the N first resources.

In a possible implementation, the configuration information is further used to configure a receive parameter of a third resource in the N first resources, the configuration information is further used to configure the receive parameters of the N first resources, or the configuration information is further used to configure the receive parameter of the second resource.

FIG. 16 is a schematic structural diagram of a communication apparatus according to an embodiment of this application. The communication apparatus shown in FIG. 16 is configured to perform some or all functions of the network device in the method embodiment described in FIG. 18. The apparatus is a network device, is an apparatus in the network device, or is an apparatus that is used together with the network device. The communication apparatus alternatively is a chip system. The communication apparatus shown in FIG. 16 includes a receiving unit 1601 and a sending unit 1602.

The sending unit 1602 is configured to send configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the identifiers of the N second resources are the same, the configuration information is further used to indicate that receive parameters of the N first resources are the same.

The sending unit 1602 is further configured to send a first reference signal on each of the N first resources.

The sending unit 1602 is further configured to send a second reference signal on the second resource.

The receiving unit 1601 is configured to receive one or more first signal to interference plus noise ratios (SINRs) reported by the terminal device.

In a possible implementation, the configuration information is further used to configure receive parameters of one or more of the N first resources, the configuration information is further used to configure the receive parameters of the N first resources, or the configuration information is further used to configure the receive parameter of the second resource.

FIG. 16 is a schematic structural diagram of a communication apparatus according to an embodiment of this application. The communication apparatus shown in FIG. 16 is configured to perform some or all functions of the terminal device in the method embodiment described in FIG. 19. The apparatus is a terminal device, an apparatus in the terminal device, or an apparatus that is used together with the terminal device. The communication apparatus alternatively is a chip system. The communication apparatus shown in FIG. 16 includes a receiving unit 1601 and a sending unit 1602.

The receiving unit 1601 is configured to receive configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the configuration information is further used to configure a third resource, the third resource is associated with the first resource set, and the third resource is a zero power reference signal resource used for interference measurement, receive parameters of the N first resources are the same.

The receiving unit 1601 is further configured to measure a signal strength on the first resource, to obtain a first signal strength.

The receiving unit 1601 is further configured to measure a signal strength on the second resource, to obtain a second signal strength.

The receiving unit 1601 is further configured to measure an interference strength on the third resource, to obtain a first interference strength.

The sending unit 1602 is configured to report one or more first signal to interference plus noise ratios (SINRs) to the network device, where the first SINR is an SINR obtained based on the first signal strength, the second signal strength, and the first interference strength.

In a possible implementation, if the configuration information is further used to configure the third resource, the configuration information is further used to indicate that the receive parameters of the N first resources are the same.

In a possible implementation, receive parameters of the N second resources, the receive parameters of the N first resources, and a receive parameter of the third resource are the same.

In a possible implementation, the configuration information is further used to configure a receive parameter of a fourth resource in the N first resources, the configuration information is further used to configure the receive parameters of the N first resources, the configuration information is further used to configure a receive parameter of a fifth resource in the N second resources, the configuration information is further used to configure the receive parameters of the N second resources, or the configuration information is further used to configure the receive parameter of the third resource.

FIG. 16 is a schematic structural diagram of a communication apparatus according to an embodiment of this application. The communication apparatus shown in FIG. 16 is configured to perform some or all functions of the network device in the method embodiment described in FIG. 19. The apparatus is a network device, is an apparatus in the network device, or is an apparatus that is used together with the network device. The communication apparatus alternatively is a chip system. The communication apparatus shown in FIG. 16 includes a receiving unit 1601 and a sending unit 1602.

The sending unit 1602 is configured to send configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N first resources are in a one-to-one correspondence with the identifiers of the N second resources, and N is an integer greater than 1, where if the configuration information is further used to configure a third resource, the third resource is associated with the first resource set, and the third resource is a zero power reference signal resource used for interference measurement, the configuration information is further used to indicate that receive parameters of the N first resources are the same.

The sending unit 1602 is further configured to send a first reference signal on each of the N first resources.

The sending unit 1602 is further configured to send a second reference signal on the second resource.

The receiving unit 1601 is configured to receive one or more first signal to interference plus noise ratios (SINRs) reported by the terminal device.

In a possible implementation, the configuration information is further used to configure receive parameters of one or more of the N first resources, the configuration information is further used to configure the receive parameters of the N first resources, the configuration information is further used to configure receive parameters of one or more of the N second resources, the configuration information is further used to configure receive parameters of the N second resources, or the configuration information is further used to configure a receive parameter of the third resource.

FIG. 16 is a schematic structural diagram of a communication apparatus according to an embodiment of this application. The communication apparatus shown in FIG. 16 is configured to perform some or all functions of the terminal device in the method embodiment described in FIG. 4. The apparatus is a terminal device, an apparatus in the terminal device, or an apparatus that is used together with the terminal device. The communication apparatus alternatively is a chip system. The communication apparatus shown in FIG. 16 includes a receiving unit 1601 and a sending unit 1602.

The receiving unit 1601 is configured to receive configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the identifiers of the N first resources are the same, the second resource set includes identifiers of N second resources, the identifiers of the N first resources are in a one-to-one correspondence with the identifiers of the N second resources, and N is an integer greater than 1. The receiving unit 1601 is further configured to measure a signal strength on the first resource, to obtain a first signal strength. The receiving unit 1601 is further configured to measure signal strengths on the N second resources, to obtain N second signal strengths. The sending unit 1602 is configured to report a first signal to interference plus noise ratio SINR to the network device based on the first signal strength and the N second signal strengths.

In a possible implementation, receive parameters of the N second resources are the same as a receive parameter of the first resource.

In a possible implementation, the sending unit 1602 is specifically configured to: determine N SINRs, where an $i^{th}$ SINR in the N SINRs is obtained based on the first signal strength and an $i^{th}$ second signal strength in the N second signal strengths, and i is an integer greater than 0 and less than or equal to N; and report one or more first SINRs in the N SINRs to the network device.

In a possible implementation, the sending unit 1602 is further configured to report positions of identifiers of first resources in the first resource set to the network device, where the first resources correspond to the one or more first SINRs.

In a possible implementation, the first SINR is obtained based on a sum of the N second signal strengths and the first signal strength.

In a possible implementation, the first resource set further includes a resource identifier different from the identifier of the first resource, and the sending unit 1602 is further configured to report a position of the identifier of the first resource in the first resource set to the network device.

FIG. 16 is a schematic structural diagram of a communication apparatus according to an embodiment of this application. The communication apparatus shown in FIG. 16 is configured to perform some or all functions of the network device in the method embodiment described in FIG. 4. The apparatus is a network device, is an apparatus in the network device, or is an apparatus that is used together with the network device. The communication apparatus alternatively is a chip system. The communication apparatus shown in FIG. 16 includes a receiving unit 1601 and a sending unit 1602.

The sending unit 1602 is configured to send configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the identifiers of the N first resources are the same, the second resource set includes identifiers of N second resources, the identifiers of the N first resources are in a one-to-one correspondence with the identifiers of the N second resources, and N is an integer greater than 1. The sending unit 1602 is further configured to send a first reference signal on the first resource. The sending unit 1602 is further configured to send a second reference signal on each of the N second resources. The receiving unit 1601 is configured to receive a first signal to interference plus noise ratio SINR reported by the terminal device.

In a possible implementation, the receiving unit 1601 is further configured to receive positions of identifiers of first resources in the first resource set, where the first resources correspond to one or more first SINRs reported by the terminal device.

In a possible implementation, the first resource set further includes a resource identifier different from the identifier of the first resource, and the receiving unit 1601 is further configured to receive a position of the identifier of the first resource in the first resource set, where the position is reported by the terminal device.

FIG. 16 is a schematic structural diagram of a communication apparatus according to an embodiment of this application. The communication apparatus shown in FIG. 16 is configured to perform some or all functions of the terminal device in the method embodiment described in FIG. 7. The apparatus is a terminal device, an apparatus in the terminal device, or an apparatus that is used together with the terminal device. The communication apparatus alternatively is a chip system. The communication apparatus shown in FIG. 16 includes a receiving unit 1601 and a sending unit 1602.

The receiving unit 1601 is configured to receive configuration information sent by a network device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N second resources are the same, the identifiers of the N first resources are in a one-to-one correspondence with the identifiers of the N second resources, and N is an integer greater than 1. The receiving unit 1601 is further configured to measure signal strengths on the N first resources, to obtain N first signal strengths. The receiving unit 1601 is further configured to measure a signal strength on the second resource for N times, to obtain N second signal strengths. The sending unit 1602 is configured to report one or more first signal to interference plus noise ratios (SINRs) to the network device, where the first SINR is an SINR in N SINRs that are obtained based on the N first signal strengths and the N second signal strengths.

In a possible implementation, a manner in which the receiving unit 1601 measures the signal strengths on the N first resources is specifically: measuring the signal strengths on the N first resources by using receive parameters of the N first resources; and a manner in which the receiving unit 1601 measures the signal strength on the second resource for N times is specifically: measuring the signal strength on the second resource for N times by using the receive parameters of the N first resources.

In a possible implementation, a periodicity of the second resource is 1/N of a periodicity of the first resource.

In a possible implementation, a periodicity of the second resource is the same as a periodicity of the first resource, and a time domain range for measuring the N second signal strengths is less than or equal to a time length of one time unit.

FIG. 16 is a schematic structural diagram of a communication apparatus according to an embodiment of this application. The communication apparatus shown in FIG. 16 is configured to perform some or all functions of the network device in the method embodiment described in FIG. 7. The apparatus is a network device, is an apparatus in the network device, or is an apparatus that is used together with the network device. The communication apparatus alternatively is a chip system. The communication apparatus shown in FIG. 16 includes a receiving unit 1601 and a sending unit 1602.

The sending unit 1602 is configured to send configuration information to a terminal device, where the configuration information is used to configure a first resource set and a second resource set, resources corresponding to resource identifiers in the first resource set are used for channel measurement, resources corresponding to resource identifiers in the second resource set are used for interference measurement, the first resource set includes identifiers of N first resources, the second resource set includes identifiers of N second resources, the identifiers of the N second resources are the same, the identifiers of the N first resources are in a one-to-one correspondence with the identifiers of the N second resources, and N is an integer greater than 1. The sending unit 1602 is further configured to send a first reference signal on each of the N first resources. The sending unit 1602 is further configured to send a second reference signal on the second resource. The receiving unit 1601 configured to receive one or more first signal to interference plus noise ratios (SINRs) reported by the terminal device.

In a possible implementation, a periodicity of the second resource is 1/N of a periodicity of the first resource.

In a possible implementation, a periodicity of the second resource is the same as a periodicity of the first resource.

FIG. 16 is a schematic structural diagram of a communication apparatus according to an embodiment of this application. The communication apparatus shown in FIG. 16 is configured to perform some or all functions of the terminal device in the method embodiment described in FIG. 10. The apparatus is a terminal device, an apparatus in the terminal device, or an apparatus that is used together with the terminal device. The communication apparatus alternatively is a chip system. The communication apparatus shown in FIG. 16 includes a receiving unit 1601 and a sending unit 1602.

The receiving unit 1601 is configured to receive configuration information sent by a network device, where the configuration information is used to configure a first resource set, resources corresponding to resource identifiers in the first resource set are used for channel measurement, the first resource set includes identifiers of N first resources, the identifiers of the N first resources are the same, and N is an integer greater than 1. The receiving unit 1601 is further configured to measure a signal strength on the first resource for N times, to obtain N signal strengths. The sending unit 1602 is configured to report a first signal strength in the N signal strengths to the network device.

In a possible implementation, a time domain range for the N times of measurement is less than or equal to a time length of one time unit.

In a possible implementation, a time domain measurement range for each of the N times of measurement is less than or equal to $N_{IFFT}/N$, and $N_{IFFT}$ is a time length of one time unit.

In a possible implementation, a time domain measurement range for each of the N times of measurement is less than or equal to $N_{IFFT}/N-N_{CP}/N$, $N_{CP}$ is a time length of a cyclic prefix, and $N_{IFFT}$ is a time length of one time unit.

In a possible implementation, the N times of measurement are performed after the cyclic prefix.

In a possible implementation, the configuration information further includes a repetition factor, the repetition factor is off, and the sending unit 1602 is further configured to report a position of an identifier of a first resource in the first resource set to the network device, where the first resource corresponds to the first signal strength.

FIG. 16 is a schematic structural diagram of a communication apparatus according to an embodiment of this application. The communication apparatus shown in FIG. 16 is configured to perform some or all functions of the network device in the method embodiment described in FIG. 10. The apparatus is a network device, is an apparatus in the network device, or is an apparatus that is used together with the network device. The communication apparatus alternatively is a chip system. The communication apparatus shown in FIG. 16 includes a receiving unit 1601 and a sending unit 1602.

The sending unit 1602 is configured to send configuration information to a terminal device, where the configuration information is used to configure a first resource set, resources corresponding to resource identifiers in the first resource set are used for channel measurement, the first resource set includes identifiers of N first resources, the identifiers of the N first resources are the same, and N is an integer greater than 1. The sending unit 1602 is further configured to send a reference signal on the first resource. The receiving unit 1601 is configured to receive a first signal strength that is in N signal strengths and that is reported by the terminal device.

In a possible implementation, the configuration information further includes a repetition factor, the repetition factor is off, and a manner in which the sending unit 1602 sends a reference signal on the first resource is specifically: sending a reference signal on the first resource for N times by using N transmit parameters.

In a possible implementation, a time domain range for sending a reference signal for N times by using the N transmit parameters is less than or equal to a time length of one time unit.

In a possible implementation, a time domain range for sending a reference signal each time is less than or equal to $N_{IFFT}/N$, and $N_{IFFT}$ is a time length of one time unit.

In a possible implementation, a time domain range for sending a reference signal each time is less than or equal to $N_{IFFT}/N-N_{CP}/N$, $N_{CP}$ is a time length of a cyclic prefix, and $N_{IFFT}$ is a time length of one time unit.

In a possible implementation, sending a reference signal for N times by using the N transmit parameters is performed after the cyclic prefix.

In a possible implementation, the configuration information further includes a repetition factor, the repetition factor is off, and the receiving unit 1601 is further configured to receive a position of an identifier of a first resource in the first resource set, where the first resource corresponds to the first signal strength reported by the terminal device.

Figure 17A:
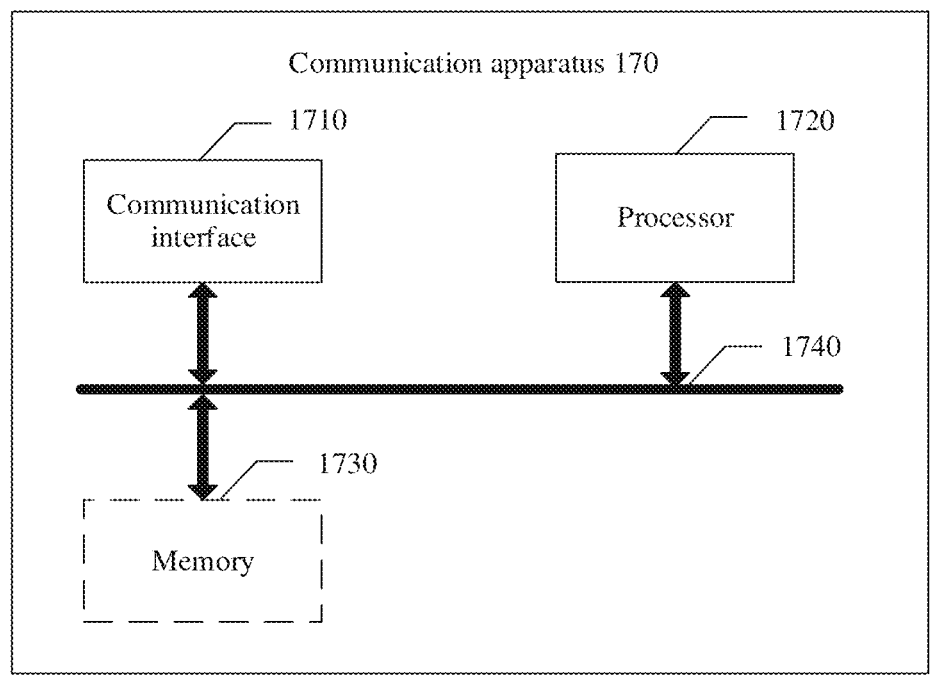
FIG. 17*a* is a schematic structural diagram of a communication apparatus according to an embodiment of this application.

FIG. 17a shows a communication apparatus 170 according to an embodiment of this application. The communication apparatus is configured to implement functions of the terminal device in the foregoing methods. The apparatus is a terminal device or an apparatus used in the terminal device. The apparatus used in the terminal device is a chip system or a chip in the terminal device. The chip system includes a chip, or includes a chip and another discrete component. Alternatively, the communication apparatus 170 is configured to implement functions of the communication device in the foregoing methods. The apparatus is a communication device or an apparatus used in the communication device. The apparatus used in the communication device is a chip system or a chip in the communication device. The chip system includes a chip, or includes a chip and another discrete component.

The communication apparatus 170 includes at least one processor 1717, configured to implement a data processing function of the terminal device or the network device in the methods provided in embodiments of this application. The apparatus 170 further includes a communication interface 1710, configured to implement receiving and sending operations of the terminal device or the network device in the methods provided in embodiments of this application. In embodiments of this application, the communication interface is a transceiver, a circuit, a bus, a module, or a communication interface of another type, and is configured to communicate with another device through a transmission medium. For example, the communication interface 1710 is used by an apparatus in the communication apparatus 170 to communicate with another device. The processor 1717 receives and sends data through the communication interface 1710, and is configured to implement the methods in the foregoing method embodiments.

The apparatus 170 further includes at least one memory 1730, configured to store program instructions and/or data. The memory 1730 is coupled to the processor 1717. Coupling in embodiments of this application is indirect coupling or a communication connection between apparatuses, units, or modules, and is in an electrical, mechanical, or another form, and is used for information exchange between the apparatuses, units, or modules. The processor 1717 cooperates with the memory 1730. The processor 1717 executes the program instructions stored in the memory 1730. At least one of the at least one memory is included in the processor.

A connection medium between the communication interface 1710, the processor 1717, and the memory 1730 is not limited in this embodiment of this application. In this embodiment of this application, the memory 1730, the communication interface 1717, and the communication interface 1710 are connected through a bus 1740 in FIG. 17*a*. The bus is represented by using a thick line in FIG. 17*a*. The foregoing is an example for description. A connection manner between other components is not limited thereto. The bus is classified into an address bus, a data bus, a control bus, and the like. For ease of representation, one thick line is used to represent the bus in FIG. 17*a*, but this does not mean that there is one bus or one type of bus.

When the apparatus 170 is specifically an apparatus used in the terminal device or the network device, for example, when the apparatus 170 is specifically a chip or a chip system, the communication interface 1710 outputs or receive a baseband signal. When the apparatus 170 is specifically the terminal device or the network device, the communication interface 1710 outputs or receive a radio frequency signal. In embodiments of this application, the processor is a general-purpose processor, a digital signal processor, an application-specific integrated circuit, a field-programmable gate array or another programmable logic device, a discrete gate or a transistor logic device, or a discrete hardware component, and implements or perform the methods, steps, and logical block diagrams disclosed in embodiments of this application. The general-purpose processor is a microprocessor, any conventional processor, or the like. The steps of the methods disclosed with reference to embodiments of this application is directly performed by a hardware processor, or is performed by using a combination of hardware in the processor and a software module.

Figure 17B:
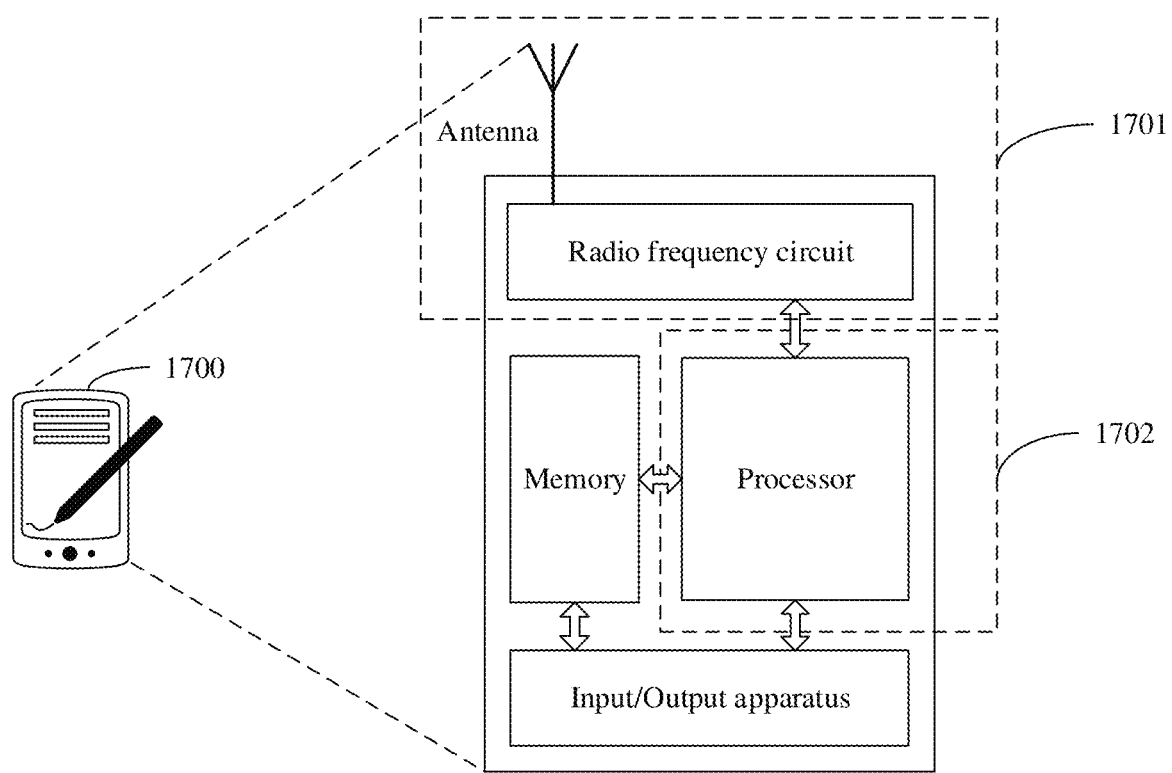
FIG. 17*b* is a schematic structural diagram of a communication apparatus according to an embodiment of this application.

For example, FIG. 17*b* is a schematic structural diagram of another terminal device 1700 according to an embodiment of this application. The terminal device performs the operations performed by the terminal device in the foregoing method embodiments.

For ease of description, FIG. 17*b* shows main components of the terminal device. As shown in FIG. 17*b*, the terminal device 1700 includes a processor, a memory, a radio frequency circuit, an antenna, and an input/output apparatus. The processor is mainly configured to: process a communication protocol and communication data, control the entire terminal device, execute a software program, and process data of the software program, for example, configured to support the terminal device in performing the procedure described in FIG. 4, FIG. 7, FIG. 10, FIG. 18, or FIG. 19.

The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The terminal device 1700 further includes an input/output apparatus, for example, a touchscreen, a display screen, or a keyboard. The input/output apparatus is mainly configured to: receive data entered by a user, and output data to the user. Some types of terminal devices are without input/output apparatus.

After the terminal device is powered on, the processor reads a software program in a storage unit, explain and execute instructions of the software program, and process data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends a radio frequency signal in a form of electromagnetic wave through the antenna. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data.

A person skilled in the art understands that, for ease of description, FIG. 17*b* shows one memory and one processor. In an actual terminal device, there is a plurality of processors and a plurality of memories. The memory is further referred to as a storage medium, a storage device, or the like. This is not limited in embodiments of this application.

In an optional implementation, the processor includes a baseband processor and a central processing unit (CPU). The baseband processor is mainly configured to process a communication protocol and communication data. The CPU is mainly configured to: control the entire terminal device, execute a software program, and process data of the software program. Optionally, the processor alternatively is a network processor (NP) or a combination of a CPU and an NP. The processor further includes a hardware chip. The hardware chip is an application-specific integrated circuit (ASIC), a programmable logic device (PLD), or a combination thereof. The PLD is a complex programmable logic device (CPLD), a field-programmable gate array (FPGA), a generic array logic (GAL), or any combination thereof. The memory includes a volatile memory (volatile memory), for example, a random access memory (RAM). The memory alternatively includes a non-volatile memory, for example, a flash memory, a hard disk drive (HDD), or a solid-state drive (SSD). The memory alternatively includes a combination of the foregoing types of memories.

For example, in this embodiment of this application, as shown in FIG. 17*b*, the antenna and the radio frequency circuit that have a transceiver function is considered as a communication unit 1701 of the terminal device 1700, and the processor having a processing function is considered as a processing unit 1702 of the terminal device 1700.

The communication unit 1701 is further referred to as a transceiver, a transceiver, a transceiver apparatus, a transceiver unit, or the like, and is configured to implement the sending and receiving functions. Optionally, a component that is in the communication unit 1701 and that is configured to implement the receiving function is considered as a receiving unit, and a component that is in the communication unit 1701 and that is configured to implement the sending function is considered as a sending unit. In other words, the communication unit 1701 includes the receiving unit and the sending unit. For example, the receiving unit is further referred to as a receiver, a receiver, a receiver circuit, or the like, and the sending unit is referred to as a transmitter, a transmitter, a transmitter circuit, or the like.

In some embodiments, the communication unit 1701 and the processing unit 1702 is integrated into one component, or is separated as different components. In addition, the processor and the memory is integrated into one component, or is separated as different components.

The communication unit 1701 is configured to perform receiving and sending operations of the terminal device in the foregoing method embodiments. The processing unit 1702 is configured to perform a data processing operation of the terminal device in the foregoing method embodiments.

An embodiment of the present disclosure further provides a computer-readable storage medium. The computer-readable storage medium stores instructions. When the instructions are run on a processor, the method procedures in the foregoing method embodiments are implemented.

An embodiment of the present disclosure further provides a computer program product. When the computer program product runs on a processor, the method procedures in the foregoing method embodiments are implemented.

For ease of description, the foregoing method embodiments are expressed as combinations of a series of actions. However, persons skilled in the art know that the present disclosure is not limited to the described action sequence, because according to the present disclosure, some steps are performed in other sequences or performed simultaneously. In addition, persons skilled in the art further know that embodiments described in the specification are example embodiments, and the related actions and modules are not necessarily mandatory to the present disclosure.

Description of the embodiments provided in this application refers to each other, and description of the embodiments has different focuses. For a part not described in detail in an embodiment, refer to related description in another embodiment. For ease of description and brevity, for functions and performed steps of the apparatuses and devices provided in embodiments of this application, refer to related description in the method embodiments of this application. Mutual reference, combination, or reference is made between the method embodiments and between the apparatus embodiments.

The foregoing embodiments are intended to describe the technical solutions of this application, rather than limit this application. Although this application is described in detail with reference to the foregoing embodiments, persons of ordinary skill in the art understand modifications to the technical solutions described in the foregoing embodiments or make equivalent replacements to some or all technical features thereof, without departing from the spirit and scope of the technical solutions of embodiments of this application.

What is claimed is:

1. An information reporting method comprising:
receiving configuration information sent by a network device;
configuring a first resource set and a second resource set based on the configuration information;
using resources corresponding to resource identifiers in the first resource set for channel measurement, the first resource set includes identifiers of N first resources;
using resources corresponding to resource identifiers in the second resource set for interference measurement, the second resource set includes identifiers of N second resources; wherein:
the identifiers of N first resources are in a one-to-one correspondence with the identifiers of N second resources;
N is an integer greater than 1; and
in response to if the identifiers of N second resources being the same, received parameters of N first resources are the same;
measuring signal strengths on N first resources, to obtain N first signal strengths;
measuring a signal strength on the second resource, to obtain a second signal strength; and
reporting one or more first signal to interference plus noise ratios (SINRs) to the network device, wherein the first SINR is an SINR obtained based on the N first signal strengths and the second signal strength.

2. The method according to claim 1, wherein:
in response to the identifiers of N second resources being the same, the configuration information is further used to indicate that the received parameters of N first resources are the same.

3. The method according to claim 1, wherein:
the measuring the signal strength on the second resource, to obtain the second signal strength comprises:
measuring the signal strength on the second resource once, to obtain one second signal strength, wherein a received parameters of the second resource is the same as the received parameters of N first resources.

4. The method according to claim 3, further comprising:
configuring received parameters of one or more of N first resources based on the configuration information;
configuring the received parameters of N first resources based on the configuration information; or
configuring the received parameter of the second resource based on the configuration information.

5. An information reporting method, comprising:
receiving configuration information sent by a network device;
configuring a first resource set and a second resource set based on the configuration information;
using resources corresponding to resource identifiers in the first resource set for channel measurement, the first resource set includes identifiers of N first resources;
using resources corresponding to resource identifiers in the second resource set for interference measurement, the second resource set includes identifiers of N second resources; wherein:
the identifiers of N first resources are in a one-to-one correspondence with the identifiers of N second resources; and
N is an integer greater than 1; wherein
in response to the configuration information being further used to configure a third resource, associating the third resource with the first resource set, and the third resource is a zero power reference signal resource used for interference measurement, received parameters of N first resources are the same;
measuring a signal strength on the first resource, to obtain a first signal strength;
measuring a signal strength on the second resource, to obtain a second signal strength;
measuring an interference strength on the third resource, to obtain a first interference strength; and reporting one or more first signal to interference plus noise ratios (SINRs) to the network device, wherein the first SINR is an SINR obtained based on the first signal strength, the second signal strength, and the first interference strength.

6. The method according to claim 5, further comprising:
in response to the configuration information being further used to configure the third resource, indicating that the received parameters of N first resources are the same based on the configuration information.

7. The method according to claim 5, wherein:
the received parameters of N second resources, the received parameters of N first resources, and a received parameter of the third resource are the same.

8. The method according to claim 7, further comprising:
configuring received parameters of one or more of N first resources based on the configuration information;
configuring the received parameters of N first resources based on the configuration information;
configuring received parameters of one or more of N second resources based one the configuration information;
configure the received parameters of N second resources based on the configuration information;
configuring the received parameter of the third resource based on the configuration information.

9. An information reporting method, comprising:
receiving configuration information sent by a network device;
configuring a first resource set and a second resource set based on the configuration information; wherein:
using resources corresponding to resource identifiers in the first resource set for channel measurement, the first resource set includes identifiers of N first resources;
using resources corresponding to resource identifiers in the second resource set for interference measurement, the identifiers of N first resources are the same, the second resource set includes identifiers of N second resources; wherein:
the identifiers of N first resources are in a one-to-one correspondence with the identifiers of N second resources; and
N is an integer greater than 1;
measuring a signal strength on a first resource, to obtain a first signal strength;
measuring signal strengths on N second resources, to obtain N second signal strengths; and
reporting a first signal to interference plus noise ratio (SINR) to the network device based on the first signal strength and the N second signal strengths.

10. The method according to claim 9, wherein;
the received parameters of N second resources are the same as a received parameter of the first resource.

11. The method according to claim 9, wherein:
the reporting the first signal to interference plus noise ratio SINR to the network device based on the first signal strength and the N second signal strengths comprises:
determining N SINRs, wherein an ith SINR in the N SINRs is obtained based on the first signal strength and an ith second signal strength in the N second signal strengths, and i is an integer greater than 0 and less than or equal to N; and
reporting one or more first SINRs in the N SINRs to the network device.

12. The method according to claim 11, further comprising:
reporting positions of identifiers of first resources in the first resource set to the network device, wherein the first resources correspond to the one or more first SINRs.

13. The method according to claim 9, further comprising:
obtaining the first SINR based on a sum of the N second signal strengths and the first signal strength.

14. The method according to claim 13, wherein:
the first resource set further includes a resource identifier different from an identifier of the first resource, and the method further comprising:
reporting a position of the identifier of the first resource in the first resource set to the network device.

* * * * *